US011360561B2

(12) United States Patent
Richter et al.

(10) Patent No.: US 11,360,561 B2
(45) Date of Patent: Jun. 14, 2022

(54) SYSTEM FOR HAPTIC INTERACTION WITH VIRTUAL OBJECTS FOR APPLICATIONS IN VIRTUAL REALITY

(71) Applicant: TECHNISCHE UNIVERSITÄT DRESDEN, Dresden (DE)

(72) Inventors: Andreas Richter, Dresden (DE); Konrad Henkel, Dresden (DE); Georgi Paschew, Dresden (DE); Uwe Marschner, Coswig (DE); René Körbitz, Radeberg (DE); Maxim Germer, Schönebeck (DE)

(73) Assignee: TECHNISCHE UNIVERSITÄT DRESDEN, Dresden (DE)

( * ) Notice: Subject to any disclaimer, the term of this patent is extended or adjusted under 35 U.S.C. 154(b) by 348 days.

(21) Appl. No.: 16/805,186

(22) Filed: Feb. 28, 2020

(65) Prior Publication Data
US 2020/0293112 A1  Sep. 17, 2020

(30) Foreign Application Priority Data

Mar. 15, 2019  (DE) .......................... 102019106684.0

(51) Int. Cl.
G06F 3/04886 (2022.01)
G06F 3/01 (2006.01)
G09B 21/00 (2006.01)
(52) U.S. Cl.
CPC ........... G06F 3/016 (2013.01); G09B 21/004 (2013.01)
(58) Field of Classification Search
None
See application file for complete search history.

(56) References Cited

U.S. PATENT DOCUMENTS

2012/0025945 A1   2/2012 Yazadi et al.
2012/0293411 A1*  11/2012 Leithinger .............. G06F 3/017
                                                    345/158

(Continued)

FOREIGN PATENT DOCUMENTS

DE      102016215481 A1     2/2018

OTHER PUBLICATIONS

Endo, Takahiro et al., "Five-Fingered Haptic Interface Robot: HIRO III," IEEE Transactions on Haptics, vol. 4, No. 1, Jan.-Mar. 2011, pp. 14-27.

(Continued)

Primary Examiner — Krishna P Neupane
(74) Attorney, Agent, or Firm — Heslin Rothenberg Farley & Mesiti P.C.

(57) ABSTRACT

The system according to the invention for haptic interaction with virtual objects comprises a visualisation unit for visualising virtual objects and the user's hand, a haptic output unit for reproducing haptic impressions at least by means of force feedback on fingertips of the user's hand, and a data processing unit for processing input data and controlling the visualisation unit and the output unit. The output unit has at least two movement-coupled segments of the interaction region, a finger-based positioning system, and a global positioning system, as well as a sensor system and actuator system. The movement-coupled segments are designed as touch surfaces, and each movement-coupled segment is assigned to one fingertip of the user's hand and can be moved by the latter. The position of the fingertip on the movement-coupled segment can be changed. The sensor system is used to detect the position of the movement-coupled segment with respect to the virtual object and the contact forces between the movement-coupled segments and the fingertips of the user's hand, while the actuator system (Continued)

serves for positioning the movement-coupled segments with respect to the virtual object and for exerting contact forces on the fingertips of the user's hand by means of the movement-coupled segments. A base reference plane for the force feedback is assigned to the haptic output unit.

20 Claims, 13 Drawing Sheets

(56) References Cited

U.S. PATENT DOCUMENTS

| | | | |
|---|---|---|---|
| 2013/0016042 A1* | 1/2013 | Makinen | G06F 3/04886 345/173 |
| 2015/0254898 A1 | 9/2015 | Therien et al. | |
| 2016/0259417 A1 | 9/2016 | Gu | |
| 2018/0157317 A1 | 6/2018 | Richter et al. | |

OTHER PUBLICATIONS

Leithinger, Daniel et al., "Direct and Gestural Interaction with Relief: A 2.5D Shape Display," UIST 2011, Oct. 16-19, 2011, Santa Barbara, CA, USA, pp. 541-548.
"Dexmo" (example for a dynamic haptic display) from Dexta Robotics (http://www.dextarobotics.com/) (accessed Feb. 28, 2020).
"CyberGrasp" from CyberGlove Systems (http://www.cyberglovesystems.com/cybergrasp/) (accessed Feb. 28, 2020).
Choi, I. et al. "Grabity: A wearable haptic interface for simulating weight and grasping in virtual reality", Proceedings of the 29th Annual Symposium on User Interface Software and Technology (UIST) (2017) ACM, New York.
Petkova, VI, Ehrsson, H.H. "If I were you: Perceptual illusion of body swapping", PLoS one 2008 3 (12), e3832.
Hiroo Iwata el al., "Project FEELEX: Adding Haptic Surface to Graphics," Institute of Engineering Mechanics and Systems, University of Tsukuba, ACM SIGGRAPH 2001, Aug. 12-17, 2001, Los Angeles, CA, pp. 469-475.

\* cited by examiner

SYSTEM FOR HAPTIC INTERACTION WITH VIRTUAL OBJECTS FOR APPLICATIONS IN VIRTUAL REALITY

CROSS REFERENCE TO RELATED APPLICATIONS

This application claims priority to German patent application number 10 2019 106 684.0, filed on Mar. 15, 2019, the entire contents of which are hereby incorporated herein by reference.

The invention relates to a system for haptic interaction with virtual objects, which comprises, at least, a visualisation unit for visualising virtual objects and the user's hand, an output unit for reproducing haptic impressions at least by means of force feedback on fingertips of the user's hand, and a data processing unit for processing input data and controlling the visualisation unit and the output unit, wherein a virtual object is characterised by haptic properties that vary according to location and that are simulated by means of a haptic output unit.

Haptic systems, e.g. displays, are so far insufficiently able to convey realistic impressions of virtual, three-dimensional objects as regards their shape and surface properties. Powerful haptic systems with an acceptable repertoire of representable virtual objects are extremely complex and cost-intensive.

Haptic displays are divided into static (fixed) and dynamic displays. Analogously to tactile static displays, static haptic displays mostly consist of many actuators, the number of actuators according to the level of detail and the size or the number of objects to be displayed. A higher level of detail correlates with a smaller taxel size and with higher resolution. The size and number of objects result in a minimum required display size and number of actuators. The display area is limited by the display size. Due to the fixed position in the room, fixed haptic displays can represent external counter forces (e.g. weight). Stationary haptic displays are usually touched by the user with the bare hand, i.e. not with the hand burdened by hardware. Direct contact with the surface is accordingly possible. An example of static (stationary) haptic displays is described in Kim S C., Han B K., Seo J., Kwon D S. "Robotic Touch Surface: 3D Haptic Rendering of Virtual Geometry on Touch Surface", in: Kajimoto H., Ando H., Kyung K U. (eds) "Haptic Interaction" Lecture Notes in Electrical Engineering, vol 277. Springer, Tokyo. Dynamic haptic displays are usually mounted on the user and can be moved around the room by the user. The user's hand is burdened by hardware, for example because the fingertips are connected to technical equipment. Compared to static (stationary) displays, dynamic displays typically have a smaller number of actuators and a lower mass. Due to the mechanical coupling to humans, no external forces (e.g. weight) can be represented. Since the dynamic display is moved by the user himself, the display area for virtual objects is theoretically unlimited. A realistic object display is only possible if the displayed object is weightless and does not interact with other objects (external forces cannot be represented). Due to the coupling to humans, only forces relative to humans (a force between thumb and forefinger) can be depicted. A representation of surface properties, such as contour and texture, is not possible or is limited due to the permanent connection of the technical equipment to the fingertip.

A disadvantage of known systems, which mainly relates to static haptic displays, is the limitation of realistic detail due to resolution limitations. The resolution of a haptic system is given by the number of surface points or segments of the display per virtual surface being displayed. The totality of the surface segments, the position and/or properties of which can be adjusted by actuators in a defined manner, establishes the explorable haptic area—hereinafter called the interaction region. A correspondingly large number of actuators is required in order to be able to display a large interaction region with high resolution—that is to say, many surface segments. As a result, the systems are disadvantageously characterised by high technical complexity, high costs, high mass and high energy consumption.

Another disadvantage of known systems, which mainly relates to dynamic haptic displays, is that immersion in virtual or expanded realities is restricted by the fact that virtual objects can only be touched with a hand which is burdened by hardware, or by means of a pen, or only with a single finger, rather than with the bare hand.

As such, the above-mentioned publication Kim S C., Han B K., Seo J., Kwon D S. "Robotic Touch Surface: 3D Haptic Rendering of Virtual Geometry on Touch Surface". In: Kajimoto H., Ando H., Kyung K U. (eds) "Haptic Interaction" Lecture Notes in Electrical Engineering, vol 277. Springer, Tokyo describes a haptic system referred to as a "robotic touch surface", which corresponds to a static, stationary display, which comprises a display with a haptic surface which is equipped with an actuator system for adjusting the tilt angle. The display surface is mechanically oriented along the virtual 3D geometry at the point of contact of the user's finger. The system thus allows a shape to be felt with a finger—which is not sufficient, however, to achieve immersion in the virtual world.

To depict a relief, pin matrices are known from the prior art as static (stationary) displays—for example, as described in Leithinger, D. et al. "Direct and gestural interaction with relief: A 2.5D shape display." Proceedings of the 24th Annual Symposium on User Interface Software and Technology (UIST) (2011) 11, 541, ACM, New York. A pin matrix is a multi-actuator system in which each pin can change its height in relation to a surface to create a three-dimensional relief.

Disadvantageously, the display of objects using a pin matrix is only possible to a very limited extent due to the unidirectional movement of the actuator system. The pin matrix displays also have the disadvantage of a very high level of technical complexity, with only a small part of the system being used for touch.

Furthermore, the wearable haptic glove "Dexmo" (example for a dynamic haptic display) from Dexta Robotics (http://www.dextarobotics.com/) is known from the prior art (e.g. US20160259417A1), which provides force feedback based on an integrated actuator system and sensor system, with each fingertip being controlled individually via a separate actuator mechanism or blocking mechanism. Another wearablehaptic glove with a cable-connected sensor system (e.g. US20120025945A1) and actuator system is the "CyberGrasp" from CyberGlove Systems (http://www.cyberglovesystems.com/cybergrasp/). "Dexmo" and "Cyber-Grasp" enable grasping virtually visible objects with force feedback. The disadvantage is that the display is limited to graspable objects; a representation of external forces, e.g. the weight that is exerted on the object, is not possible. In addition, complex electromechanical components have to be coupled to parts of the user's hand in such a way that a kind of exoskeleton is connected to the glove. The mass and cable routing of the electromechanical components hinder the free movement of the user and adversely affect immersion in the virtual world.

The HIRO III is a known, dynamic haptic glove (with limited range of motion) that can also be used to reproduce external forces such as weight (Endo, T. et al. "Five-Fingered Haptic Interface Robot: HIRO III." IEEE Trans Haptics (2011) 4, 14). HIRO III includes a five-finger haptic hand that is attached to a robot arm. The fingertips of the haptic hand are connected to the fingertips of the user's hand, which are provided with a holder, by means of passive magnetic ball joints. In this system as well, the hand of the user is burdened by hardware, and immersion in the virtual world is hindered. The magnetic forces cause the user to feel tensile and/or compressive forces on his fingertips, which disturbs immersion. In addition, edges or a certain texture of the surface or its temperature cannot, or can only roughly, be transmitted to the user's hand.

A wearable, dynamic haptic system which is also suitable for representing external forces, such as weight, is disclosed in Choi, I. et al. "Grabity: A wearable haptic interface for simulating weight and grasping in virtual reality", Proceedings of the $29^{th}$ Annual Symposium on User Interface Software and Technology (UIST) (2017) ACM, New York. This system is a gripping tool in which the inertial force of the gripped virtual objects is simulated by means of asymmetrical vibrations of the tool using moving coil actuators. A more expansive haptic interaction is not possible with the presented tool.

In principle, the possibilities of static haptic displays for a complete immersion are much greater than those of dynamic displays. The quality of immersion describes the extent to which the user can differentiate whether he is in a real or a virtual world. The higher the quality of immersion, the less distinguishable are the real and virtual world. The goal is that the quality is so high that the user accepts the virtual hand as his own and the virtual body as a real existing body.

Several properties of the system are important for acceptance, including inter alia the characteristics of the touched object surface and the simultaneity between the haptic touch—for example, with the visual representation and/or the associated sounds. The importance of simultaneity has been confirmed in experiments, for example in Petkova, V I, Ehrsson, H. H. "If I were you: Perceptual illusion of body swapping", PLoS one 2008 3 (12), e3832. Another important aspect with regard to the acceptance of a system is the user's hand being burdened by hardware. Immersion is disrupted if the hand and especially the fingertips are weighted with hardware.

The object of the present invention is to overcome the noted disadvantages of the prior art and to provide a system by means of which a natural transmission of impressions of the shape and surface properties of virtual three-dimensional objects, haptic interaction with these, and the reproduction of impressions of the external forces acting on the objects are possible for a bare hand that is not weighted with hardware, wherein the technical outlay and, particularly, the associated mass of the system should be significantly lower than is known in the prior art. In other words, a haptic interface for touching virtual objects with bare fingers should be created and should be characterised by reduced technical complexity and a low mass, with the greatest immersion possible for the user in the virtual world.

The object is achieved by a system having the features of clause 1 and by a method having the features of clause 14. Further developments of the invention are specified in the dependent clauses, and in the claims that follow this description.

The solution according to the invention is based in particular on the fact that the technical complexity and the mass of the system are reduced in comparison to a static haptic display by the fact that only segments of the virtual object that are necessary for the function—for example, near the fingertips—are represented by segments of the interaction region of the haptic output unit (the display) as a touch surface, wherein the representation is dynamic. Also, due to the mobility of these segments, larger surfaces can be depicted. The representable segments are not limited only to segments near the fingertips but can rather be assigned to any area of the hand—for example, areas of the palm of the hand or the wrist. By means of a base reference surface—for example, the table on which the system is placed—it is possible to simulate external forces such as the weight on the virtual object. In general, counterforces acting on the user (for example of immovable objects) can be simulated. The base reference surface is preferably statically supported with respect to at least one spatial direction, such that external forces acting in this at least one spatial direction can be reproduced. The base reference surface can be movably mounted in other spatial directions. The mounting is preferably designed with low friction—i.e., for low-force displacement. Embodiments with variable reference surfaces are also possible—i.e., any number and any direction of simulatable forces and torques are possible. This can be realised using an appropriate actuator system. In addition to generating counterforces, the base reference surface also serves to determine the location of the system in virtual space, and thus provides a reference coordinate system.

The system according to the invention is suitable for haptic interaction with virtual objects. In this case, a virtual object is characterised by haptic—that is to say, palpable, properties that are variable according to the location. In this context, the terms "according to the location" (or position) refer to the location or position of a surface segment on the virtual object. In other words, the virtual object has different haptic properties at different locations on its surface. The haptic properties relate to 3D information (relief data), i.e. the simulation of shapes of bodies. In addition, tactile properties of the virtual object can also be simulated by means of a contact surface. The haptic and tactile properties of the contact surface can be changed to the same extent, according to the location, as the haptic and tactile properties of the virtual object. The tactile properties describe the composition (roughness, temperature, etc.)—that is, most of all, the texture—of a surface.

The system according to the invention comprises at least the following components:
- a visualisation unit for the visualisation of virtual objects and the user's hand,
- a haptic output unit for reproducing haptic impressions at least by means of force feedback on fingertips of the user's hand, and
- a data processing unit for processing input data and controlling the visualisation unit and the haptic output unit.

The visualisation unit can be, for example, 3D glasses. The virtual object is usually displayed stereoscopically by means of the visualisation unit.

The data processing unit can be, for example, a microcontroller or a PC with a graphics and physics engine. The data processing unit also has the task of synchronising temporal and spatial events in virtual space and in real-world space—preferably in real time.

The haptic output unit is suitable for reproducing haptic impressions at least by means of force feedback, wherein "force feedback" denotes a feedback of forces to the user, taking advantage of his haptic perception.

The haptic output unit at least comprises:
- at least two movement-coupled segments of an interaction region of the haptic output unit, wherein the movement-coupled segments are designed as touch surfaces and each movement-coupled segment is assigned to one fingertip of the user's hand and can be moved by the latter, wherein the position of the fingertip on the movement-coupled segment can be changed,
- a finger-based positioning system comprising at least two finger-based positioning elements, each assigned to one movement-coupled segment of the interaction region, wherein the finger-based positioning elements and the movement-coupled segment assigned thereto are operatively connected,
- a global positioning system, by means of which the finger-based positioning system can be moved, or which is designed as a displacement of the virtual world in which the virtual object is arranged. In the latter case, the position of the global positioning system in real-world space does not change; only the position of the displayed user's hand in the virtual world changes; that is, the virtual world is moved and/or rotated in front of the user in the virtual 3D representation.

The interaction region is a prespecified spatial area which is defined by the spatial boundaries of the mobility of the global positioning system and the finger-based positioning elements, and in which the user can experience haptic and, if applicable, tactile impressions of the properties of the virtual object. The movement-coupled segments are freely movable within the interaction region, and each depict the surface of the virtual object at the (virtual) position of the fingertips on the virtual object. Since the position of the fingertip on the movement-coupled segment can be changed—that is, the fingertip is not firmly connected to the movement-coupled segment—the hand of the user is not burdened by hardware. This means that the user works with a bare hand, such that the immersion in the virtual world is facilitated by a near-natural or even truly natural feeling. For example, he does not have the impression that his hand is "sticking" to the surface of the virtual object, or that the user is interacting with a technical system. In addition, due to the free mobility of the fingertip on the movement-coupled segment, with the presence of a tactile actuator system that is suitable for depicting, for example, an edge of the virtual object within the movement-coupled segment, such an edge can be felt in a much finer, more precise and more natural way.

Each of the movement-coupled segments has a minimum size adapted to the size of the associated fingertip. This is preferably at least 1.5 cm×1.5 cm, particularly preferably at least 2 cm×2 cm, for a movement-coupled segment which is assigned to a thumb, and for a movement-coupled segment which is assigned to a finger other than a thumb, preferably at least 1 cm×1 cm, particularly preferably at least 1.5 cm×1.5 cm. Of course, the movement-coupled segments can also have circular or oval or other peripheral geometries and are not limited to rectangular or square peripheral geometries. In the case of round peripheral geometries, the preferred minimum values mentioned correspond in each case to the preferred minimum radius of the movement-coupled segment.

The output unit also comprises:
- a sensor system which is designed at least to detect the position of the movement-coupled segments of the interaction region with respect to the virtual object and to detect the contact forces between the movement-coupled segments and the fingertips of the user's hand, and
- an actuator system that is designed at least for positioning the movement-coupled segments of the interaction region with respect to the virtual object and for exerting contact forces on the fingertips by means of the movement-coupled segments—that is, for force feedback.

The sensor system can also be designed as a sensor system not based on the evaluation of force or torque or can at least contain the same. Such a sensor system would be, for example, an optical sensor system based on the detection of light in the wavelength range visible to humans, or a sensor system based on infrared or ultrasound detection.

Due to the free movability of the movement-coupled segments of the interaction region in the interaction region and the associated continuance of each of the fingertips on the same segment of the interaction region, fewer actuators and/or fewer degrees of freedom are necessary in the positioning system. As such, the positioning system is technically simpler, lighter in terms of its mass, and can be produced more cost-effectively as a whole.

A base reference surface is assigned to the haptic output unit for the force feedback. In the real world, this base reference surface is, for example, the base surface on which the finger-based positioning system is arranged on the global positioning system—for example, a table or a robot arm or a part of the human body. In the virtual world, the representation of the virtual object is arranged in the base reference surface.

In conjunction with the global positioning system, the base reference surface advantageously enables the reproduction of external forces, in particular the weight of the virtual object or the inertial force when the user accelerates the virtual object.

The movement-coupled segments of the interaction region can be designed, for example, as flat or ergonomically shaped touch surfaces.

The global positioning system can be combined with at least one additional global positioning system for individual fingers of the user's hand, in particular for the thumb.

Advantageously, no additional aids such as a glove or a pen, which burden the user's hand and can stand in the way of the immersion of the user in the virtual world, are required. The user's hand rests on the segments of the interaction region designed as touch surfaces, without a further connection to the hardware of the haptic system.

By reducing a large display to fingertip-sized movement-coupled segments of the interaction region that can change their properties according to their global and/or local position, the limitations of the prior art—in particular, with regard to the system mass and costs—are advantageously alleviated.

In addition, the finger-based positioning system can also contain universally usable movement-coupled segments that are suitable for contacting palms, wrists, etc.

With a foot or toe-related positioning system and a design adapted to increased stability requirements, the system according to the invention can also be used for haptic exploration of, for example, terrain surfaces by means of a foot.

In embodiments, the system according to the invention furthermore has a position sensor system for contactless detection of the spatial position of the hand of the user. The position sensor system is used for contactless detection of the position of the user's hand and/or the haptic output unit in real-world space. The position data are used by the data processing unit to display the hand of the user and/or reference points on the surface of the virtual object which correspond to the position of the haptic output unit in real-world space, using the visualisation unit, and/or to enable a synchronisation of events in the virtual space and the real-world space. "Synchronisation of events" is understood to mean that events from different domains take place synchronously, both in time and space. Visual information from the virtual world must be made available at the same time as the associated haptic stimuli from the real world. In addition, visual information from the virtual world must be provided at the same location as the associated haptic stimuli from the real world. With successful synchronisation, a user feels a haptic stimulus in a location in the real world at the same time as the visualisation of this stimulus in the same location in the virtual world. A consistent virtual world (immersion) only arises for the user if multimodal/multisensory stimuli are provided synchronously. The synchronisation of events makes it possible in particular to establish contact between the user's hand and the haptic output unit, and in particular the touch surfaces, without eye contact of the user with the haptic output unit in the real-world space. As such, a user can position his fingertips precisely on the touch surfaces without prior contact even if he has already been immersed in the virtual world via the visualisation unit—that is, for example, he has already put on the 3D glasses.

In one embodiment of the invention, the haptic output unit comprises five movement-coupled segments of the interaction region. Each finger of the user's hand can thus be assigned one movement-coupled segment of the interaction region, and thus one touch surface.

This embodiment is advantageously characterised by particularly good immersion of the user in the virtual world.

In a further embodiment of the invention, the haptic output unit is designed to reproduce haptic impressions by means of tactile feedback in addition to force feedback on fingertips of the user's hand—that is to say, it has an actuator system for tactile stimuli. Whereas, in force feedback, the positions of the individual fingers are influenced, tactile feedback can be used, for example, to simulate the texture and/or the temperature of the surface of a virtual object.

This embodiment also improves the immersion of the user in the virtual world.

In one implementation of this embodiment, the movement-coupled segments of the interaction region are designed to be changeable with regard to their contour or texture or type of vibration or vibration intensity or temperature or elasticity, or a combination of the aforementioned properties. The temperature of the touch surfaces can be controlled via Peltier elements and/or heaters, for example. Textures, in particular the roughness, of the virtual surface can be simulated using exciters that stimulate the touch surface to vibrate. A change in the elasticity of the virtual object can be realised by stiffening mechanisms acting on the touch surfaces, such as particle jamming—i.e., the fact that the granulate particles of a granular medium block each other above a certain packing density and can prevent further movement, whereas the medium is deformable at a lower packing density of the granular particles.

In a further embodiment of the system according to the invention, the haptic output unit has adjusting elements for adaptation to the size of the user's hand. In each case, an adjusting element can be arranged on a finger-based positioning element, such that the finger-based positioning elements can be made movable relative to each other, and their distance from each other can be changed. The adjusting elements can be designed for manually setting and fixing the position of the finger-based positioning elements relative to each other. In this case, the finger-based positioning elements are moved by the user himself or an assistant, and fixed, for example, by means of retaining screws. However, the adjusting elements can also be designed to automatically adapt the finger-based positioning elements to the user's hand. In this case, the finger-based positioning elements align themselves automatically or independently and halt in this position in such a way that they match and correspond to the size of the user's hand.

The positioning elements of the finger-based positioning system and the global positioning system each have between one and six degrees of freedom of movement. In a further embodiment of the system according to the invention, the positioning elements of the finger-based positioning system and/or the global positioning system each have six degrees of freedom of movement—that is to say, all three translational and all three rotary degrees of freedom.

In a further embodiment, the global positioning system is fixed in at least one degree of freedom and is mounted with particularly little friction, such that it can be moved in other spatial directions by the user with as little force as possible (with no drive). This example is a passive global positioning system.

In a further embodiment of the haptic system according to the invention, the virtual object can also be touched on the sides thereof. If the finger-based positioning elements are displaceable and/or rotatable, the movement-coupled segments of the interaction region, such as a button or small ball, can be gripped—i.e., the object is laterally surrounded by the fingers and/or the palm of the hand. This enables, for example, an application in which the virtual object fulfils an active technical function (e.g. as a joystick in an excavator or the like).

In this embodiment, the elements are displaceable in such a way that at least their centre point or their surface normal coincides with the centre point or the surface normal of the virtual surface—preferably their centre point and their surface normal coincide with the centre point and the surface normal of the virtual surface. The virtual surface denotes the explorable segment of the surface of the virtual object being depicted. In the event that the global positioning system is designed as a displacement of the virtual world, it is sufficient that only the surface normal of the movement-coupled segments of the interaction region coincides with the surface normal of the virtual surface.

In a further embodiment of the haptic system according to the invention, the sensor system used to detect the position of the movement-coupled segments of the interaction region includes microswitches with discrete switching points or encoders or resistive measuring elements, for example potentiometers, or optical measuring elements, for example for performing laser triangulation, or capacitive measuring elements or inductive measuring elements or a combination of the aforementioned. One- or multi-dimensional force sensors and/or torque sensors are used to detect the contact forces between the movement-coupled segments of the interaction region and the fingertips of the user's hand.

In a further embodiment of the haptic system according to the invention, the global positioning system comprises means for linear displacement and/or for rotation of the finger-based positioning system.

In one implementation of this embodiment, these means comprise a linearly displaceable unit, in particular having two translational degrees of freedom of movement, or a robot arm, in particular with six—that is to say, three translational and three rotary—degrees of freedom of movement, or a hexapod, in particular with six degrees of freedom of movement, or a lifting-rotating arrangement or a combination of the aforementioned, wherein in particular the lifting-rotating arrangement can be combined with the linearly displaceable unit to form a means with six degrees of freedom of movement.

In a further embodiment of the haptic system, the finger-based positioning system comprises at least one linear axis for each finger-based positioning element, by means of which each movement-coupled segment of the interaction region can be displaced in an axial direction and/or—if more than one linear axis is used, in particular three linear axes—the angle of inclination of the finger-based positioning element and/or of the movement-coupled segment of the interaction region can be adjusted with respect to the base reference surface. A "linear axis" is a linear guidance with a drive and the ability to assume a defined position. The position of the linear axis can be set by a controller and detected by means of the sensor system of the output unit. This enables a control.

In implementations of this embodiment of the haptic system according to the invention, the linear axis comprises a toothed belt drive or a spindle drive or a linear motor or an ultrasonic piezo motor or an element with a shape-memory alloy, or a combination of the aforementioned.

In further implementations of this embodiment of the haptic system according to the invention, the output unit has a sensor system for detecting the angle of inclination of the finger-based positioning element and/or the movement-coupled segment of the interaction region with respect to the base reference surface. The sensory detection can take place, for example, directly by means of angle sensors or indirectly by means of force sensors or spring elements or by a combination of linear distance sensors with a joint.

The system according to the invention can also have contact surfaces for further areas of the hand, for example the heel of hand. These serve to improve the hand position from an ergonomic point of view, and as such, the duration of uninterrupted use of the system by a user can be extended, for example. These contact surfaces are also preferably provided with positioning elements, such that an ergonomic hand position can be maintained even when the position of the movement-coupled segments is changed.

The system according to the invention can be used not only for haptic interaction with virtual objects, but also at any haptic workplace. In addition, it can also be coupled to one or more other systems, for example for medical applications with manipulators.

The method according to the invention for haptic interaction with virtual objects using the system according to the invention has different method steps in different operating modes.

A first operating mode is characterised in that there is no contact between at least one of the movement-coupled segments and the fingertip assigned to this segment. In this case, haptic interaction with the virtual object is not yet possible. In order to establish the contact between the movement-coupled segment and the fingertip, the position and the movement of the user's hand in the space is determined in relation to the position of the movement-coupled segment, without contact. This can be done, for example, optically—i.e., using visible light, with infrared or with ultrasound. Subsequently, a target point for each movement-coupled segment for which there is no contact between the corresponding fingertip and the movement-coupled segment is visualised on the virtual object. This means that a target point for each fingertip that is not yet in contact with the movement-coupled segment assigned to said fingertip is shown to the user on the virtual object, which is already displayed to him by the visualisation unit. This target point corresponds to a real position of the movement-coupled segment in relation to the user's hand. On the basis of the target point, the user can guide his hand, which is also represented by the visualisation unit, to the position of the movement-coupled segment, and thus establish contact between the fingertip and the movement-coupled segment. As an alternative or in addition to the visualisation, the movement-coupled segment for which there is no contact between the corresponding fingertip and the movement-coupled segment is moved to a collision point with the surface of the virtual object, said collision point being calculated from the position and the movement of the user's hand and the position of the movement-coupled segment. This requires a constant movement of the user's hand in space. Of course, the position and movement of the user's hand can also be constantly redetermined and the collision point adjusted accordingly. The global positioning system, the finger-based positioning elements and the adjusting elements can be used to move the movement-coupled segment. As a result, the fingertip and the associated movement-coupled segment meet, and contact is made on the virtual object surface. The adjusting elements in this case are only intended for the adaptation to different hand sizes and are set once per user. Automated adjustment of the adjusting elements—i.e., the automatic adaptation as described above—is possible via a sensor system and an actuator system.

A second operating mode is characterised in that there is contact between each of the movement-coupled segments and the fingertips assigned to them. In this case, the movement of the user's hand with respect to the virtual object is calculated from the movement of the fingertips on the movement-coupled segments and/or from a force effect of the fingertips on the movement-coupled segments. As a result, haptic impressions of the virtual object can be generated in the user's hand via the actuator system, with the help of the movement-coupled segments. This is done by positioning the movement-coupled segments of the interaction region, exerting contact forces on the fingertips using the movement-coupled segments, and/or changing one or more tactile properties of the movement-coupled segments, such as, for example, contour, texture, type of vibration, vibration intensity, temperature and elasticity.

The data processing unit of the haptic system switches between the two operating modes as soon as the respective conditions are met.

Further process steps, such as the visualisation of the virtual object and the user's hand in or by the visualisation unit, the data processing of input data and the control of the visualisation unit and the output unit, are known from the prior art and are not described separately here—although they are of course part of the haptic interaction process. Adjusting the output unit to the size of the user's hand is also a known method step.

In a further aspect of the invention, the haptic output unit according to the invention already described is used in a system for conveying information for the blind and visually impaired. Such a system includes a haptic output unit for reproducing haptic impressions on fingertips of the user's hand and a data processing unit for processing input data and for controlling the haptic output unit. Information to be conveyed is characterised by properties which can vary according to location, and which are simulated haptically in an interaction region by means of the haptic output unit. Such information can be, for example, a letter, a number, a character, a graphic, an icon or a virtual body or a combination of several of these. The information to be conveyed can be real—for example printed out on paper or displayed on a screen—or only virtual, in the form of data, for example in a memory or software. Letters, numbers and characters can be in normal form or displayed as Braille.

According to the invention, the haptic output unit has a frame, at least one movement-coupled segment of the interaction region, and a finger-based positioning system, as well as a sensor system and an actuator system. The frame delimits the interaction region, which extends in a first direction and a second direction which is perpendicular to the first direction. Each movement-coupled segment of the interaction region is designed as a touch surface and is assigned to exactly one fingertip of the user's hand and can be moved by the latter in the interaction region along the first and/or the second direction. The position of the fingertip on the movement-coupled segment can be changed, since the fingertip rests only on the movement-coupled segment and is not held by mechanical aids. The finger-based positioning system contains at least one finger-based positioning element, each finger-based positioning element being assigned to exactly one movement-coupled segment of the interaction region. The finger-based positioning element and the movement-coupled segment of the interaction region assigned to it are operatively connected. The sensor system serves at least to detect the position of the movement-coupled segments of the interaction region within the interaction region, while the actuator system is suitable for creating the haptic impression of the movement-coupled segments of the interaction region in accordance with the properties of the information.

The system according to the invention for conveying information for the blind and visually impaired is characterised in that each finger-based positioning element is suitable for moving the respective movement-coupled segment along a third direction, wherein the third direction is perpendicular to the first and second direction, and the actuator system is suitable for positioning the movement-coupled segments of the interaction region in accordance with the properties of the information and exerting contact forces on the fingertips of the user's hand by means of the movement-coupled segments of the interaction region. A base reference surface for force feedback is assigned to the haptic output unit. Compared to what is possible with the usual lifting elements of a Braille cell, this means that information can be displayed more precisely or the spatial contours of only-virtual bodies or 3-D representations can be communicated to the blind and visually impaired by using the third dimension for the entire fingertip of a user's hand.

In embodiments of the system according to the invention for conveying information for the blind and visually impaired, each movement-coupled segment of the interaction region has a plurality of pin-shaped lifting elements. The actuator system in this case is suitable for controlling the lifting elements of the respective movement-coupled segment in such a way that they generate a tactile relief on the surface of the movement-coupled segment. This allows an improved depiction of contours or surface properties of a virtual body, such as roughness. Alternatively or additionally, a braille cell having the lifting elements can also be implemented, so that further information can be transmitted to the user.

In further embodiments of the system according to the invention for conveying information for the blind and visually impaired, each movement-coupled segment and/or each finger-based positioning element also contains a detector that is suitable for detecting an input by the user. Such a detector can be a pressure sensor, for example, which triggers a signal when the user's finger presses on the movement-coupled segment using a defined pressure. For example, displayed icons can be clicked or commands can be confirmed without the user having to move his hand away from the movement-coupled segment.

The invention is not limited to the illustrated and described embodiments. Rather, it also comprises all embodiments which have the same effect for the purpose of the invention. Furthermore, the invention is also not limited to the feature combinations specifically described, but may also be defined by any other combination of specific features of any of the individual features disclosed as a whole, provided that the individual features are not mutually exclusive or that a specific combination of individual features is not explicitly excluded.

In the following, the invention will be explained with design examples based on figures, without being limited to said figures.

In which:

FIG. 1*a* shows a haptic output unit of a haptic system according to the invention;

FIG. 1*b* shows a schematic plan view of a user's hand and the segments of the interaction region of the haptic output unit from FIG. 1*a*;

FIG. 1*c* shows a schematic top view of a user's hand and an interaction region of a static haptic system from the prior art;

FIG. 2 shows the exploration of a virtual surface by means of a part of a haptic output unit;

FIGS. 3*a* to 3*d* show embodiments for the global positioning system of a haptic output unit;

FIGS. 4*a* and 4*b* show exemplary embodiments for the positioning elements of the finger-based positioning system of a haptic output unit;

FIG. 5 shows the haptic system according to the invention as a block diagram;

FIGS. 6*a* and 6*b* show steps of the method for haptic interaction in a first and a second operating mode;

Figure 1A:
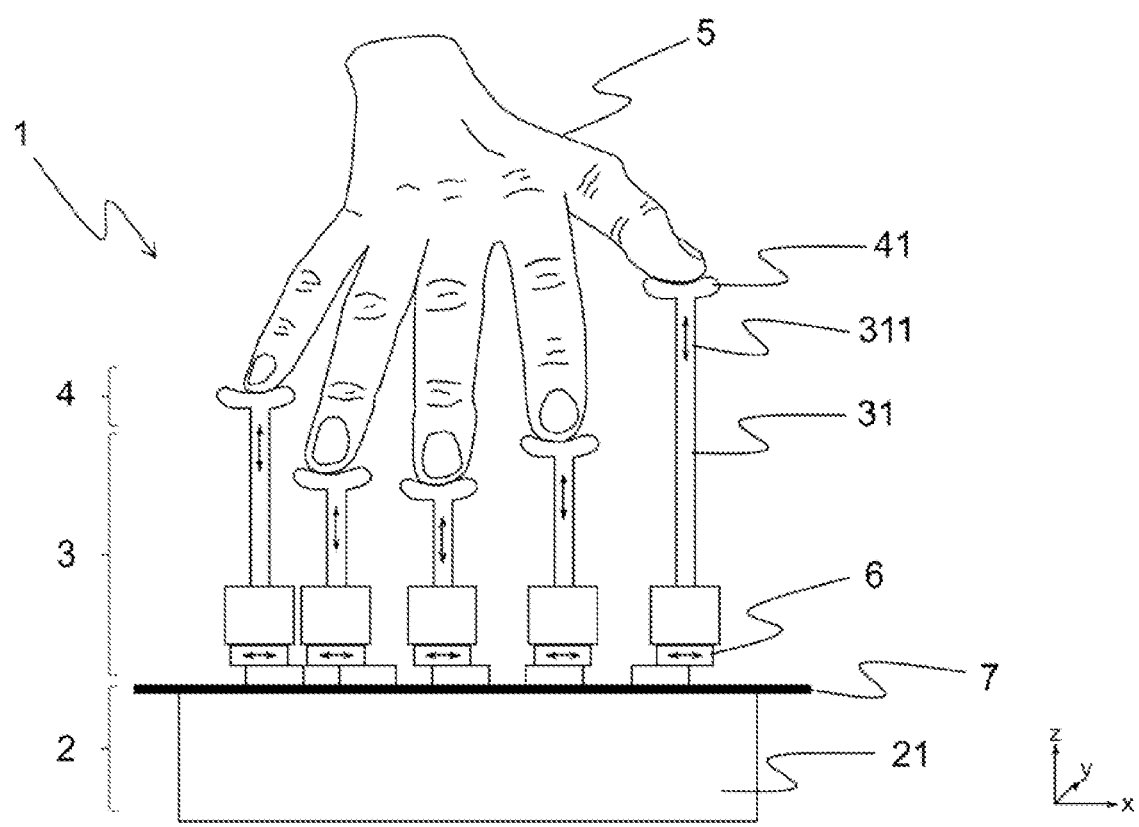

FIG. 1*a* shows a sketch of an exemplary embodiment of a haptic output unit 1 of a haptic system according to the invention, wherein the visualisation unit and the data processing unit belonging to the haptic system are not shown.

The haptic output unit 1 can be divided into a lower layer 2, a middle layer 3 and an upper layer 4. The lower layer 2 comprises the global positioning system 21. The middle layer 3 comprises a finger-based positioning system having five finger-based positioning elements 31. The upper layer 4 comprises touch surfaces 41 which represent movement-coupled segments of an interaction region of the haptic output unit 1 which reproduces the virtual surface to be explored (not shown). Each of the five touch surfaces 41 is arranged on a finger-based positioning element 31. One fingertip of a user's hand 5 rests on each of the touch surfaces 41. For the comprehensive exploration of the virtual surface, the finger-based positioning elements 31 are moved by means of a global positioning system 21, such that the finger-based positioning elements 31 together with the touch surfaces 41 each represent different segments of the interaction region. In the exemplary embodiment shown, each finger-based positioning element 31 has a linear axis 311, by means of which the local position of the touch surface 41 can be controlled and regulated with respect to the virtual surface, and which produces a force feedback on the respective finger of the user's hand 5—in the example, with one degree of freedom in the z-direction (indicated by the double arrow). Extended systems enable force feedback and movement in all Cartesian spatial directions, and a rotation around the same.

The distance between the finger-based positioning elements 31 and thus the touch surfaces 41 can be changed by means of adjusting elements 6 (indicated by the double arrow in the x-direction) in order to adapt the dimensions of the finger-based positioning system to the size of the user's hand 5, wherein each finger-based positioning element 31 has an adjusting element 6. The finger-based positioning elements 31 are arranged on a base reference surface 7. Of course, an adjustment of the positioning elements 31 is not only possible in the x-direction, as shown, but also in the y-direction and optionally also in the z-direction. A rotation of the positioning elements around said spatial axes is also possible in further embodiments.

FIG. 1b again illustrates the design of the touch surfaces 41 as segments of the interaction region 101 in a plan view of the user's hand 5 and the touch surfaces 41, wherein, in the exemplary embodiment shown, these are also freely movable within the interaction region 101 in the x- and y-directions, in addition to the z-direction. The interaction region 101 is a prespecified spatial area which is defined by the spatial limits of the mobility of the global positioning system and the finger-based positioning elements, and in which the user can experience haptic and, optionally, tactile impressions of the properties of the virtual object. Each of the touch surfaces 41 in this case can be movable independently of the other touch surfaces 41 in the x- and y-directions within the limits of the mobility of the user's hand 5. In the simplest case, however, the distances in the x- and y-directions between the individual touch surfaces 41 are constant after adjustment to the size of the user's hand 5, such that all touch surfaces 41 are moved in the same way in the x- and/or y-direction.

Figure 1B:
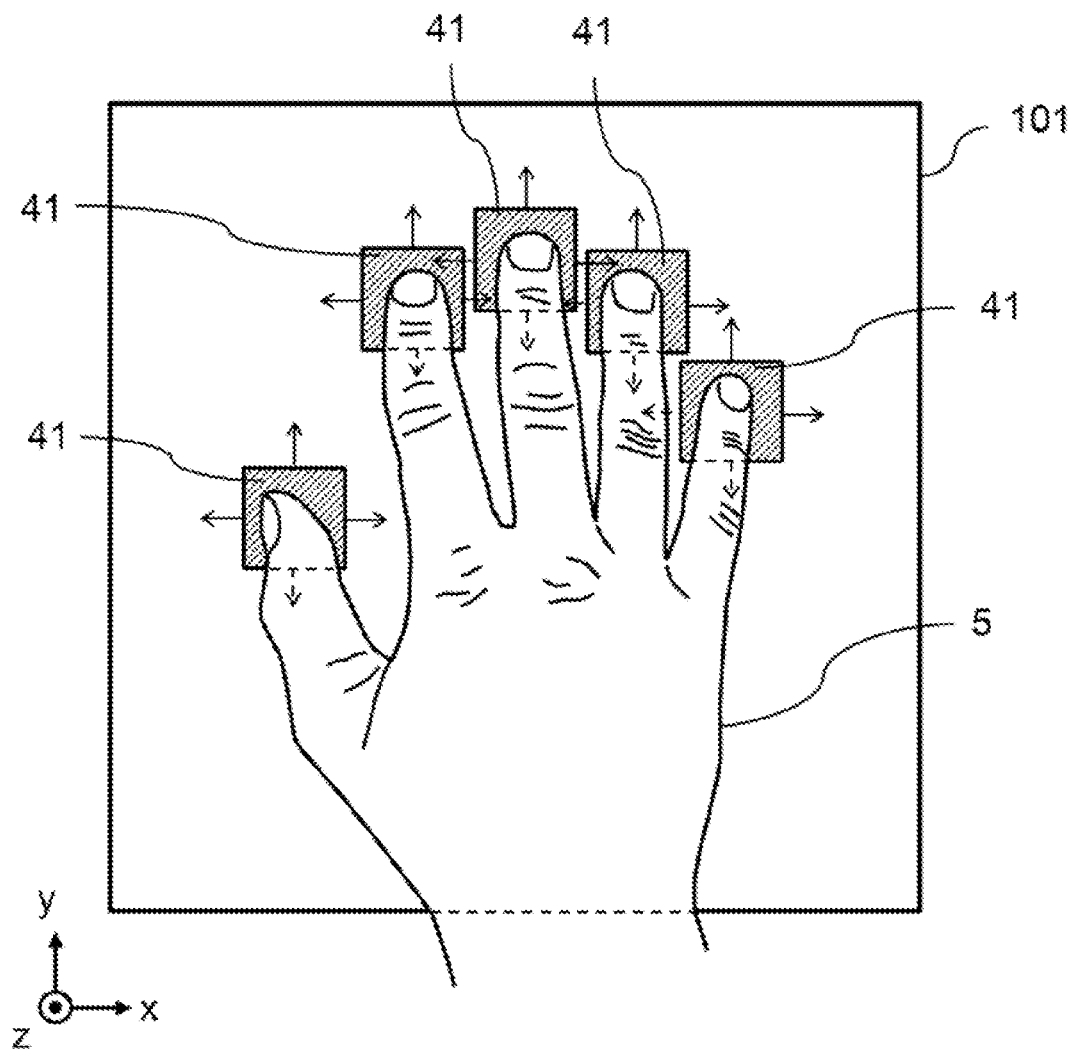
Figure 1C:
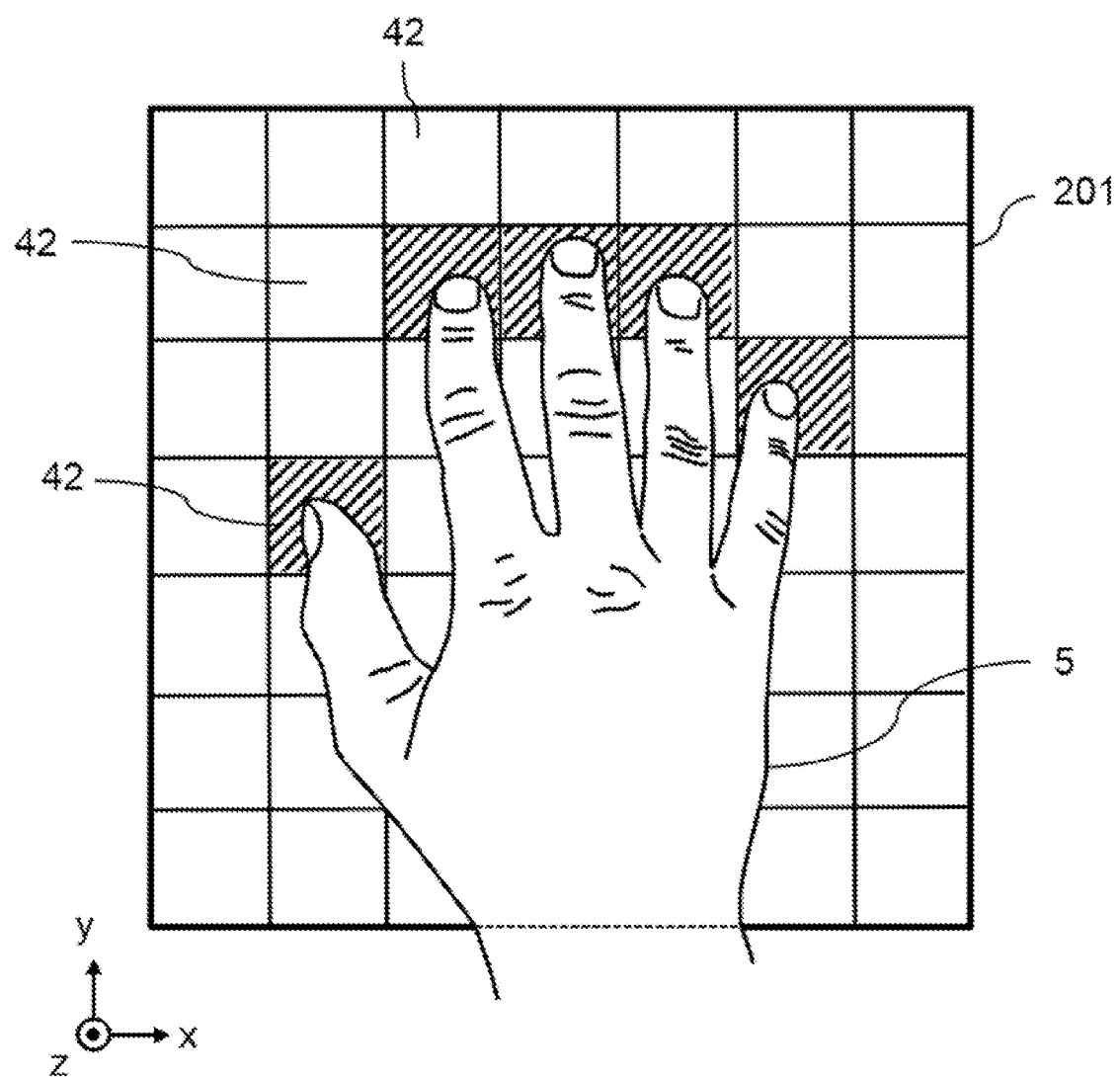

FIG. 1c shows, by comparison, an interaction region 201 of a static system for haptic interaction according to the prior art. In this case, the interaction region 201 is realised by a display with touch surfaces 42 that are stationary in the x- and y-directions. The example shows a 7×7 display in which a total of 49 touch surfaces 42 are arranged in seven rows and seven columns. The user's hand 5 moves in the real-world space in the interaction region 201 over the touch surfaces 42, while in the virtual space it moves over the surface of the virtual object. The surface of the virtual object is simulated by adjusting the height of the touch surfaces 42 in the z-direction, and optionally setting a tilt angle of the touch surfaces 42. The user's hand 5 touches only some of the touch surfaces 42 with its fingertips. These touch surfaces 42 are shown hatched in FIG. 1c. For each of the touch surfaces 42, an actuator system must be included for adjusting the height of the respective touch surface 42, and optionally its tilt angle, and optionally for adjusting elements which transmit tactile stimuli to the fingertips of the user's hand 5.

In contrast, the system 100 according to the invention in FIGS. 1a and 1b only requires a smaller number of actuators—for example, three actuators for each touch surface 41, for moving the respective touch surface 41 in the x-, y- and z-directions, and corresponding actuators for moving the global positioning system. This significantly reduces the complexity of the system. Since the number of actuators for large interaction regions in static systems according to the prior art, as illustrated by way of example in FIG. 1c, increases sharply, while the number remains constant for the system 100 according to the invention, the interaction regions in the system according to the invention can be made much larger with little additional outlay, and thus larger virtual objects can be depicted.

Figure 2:
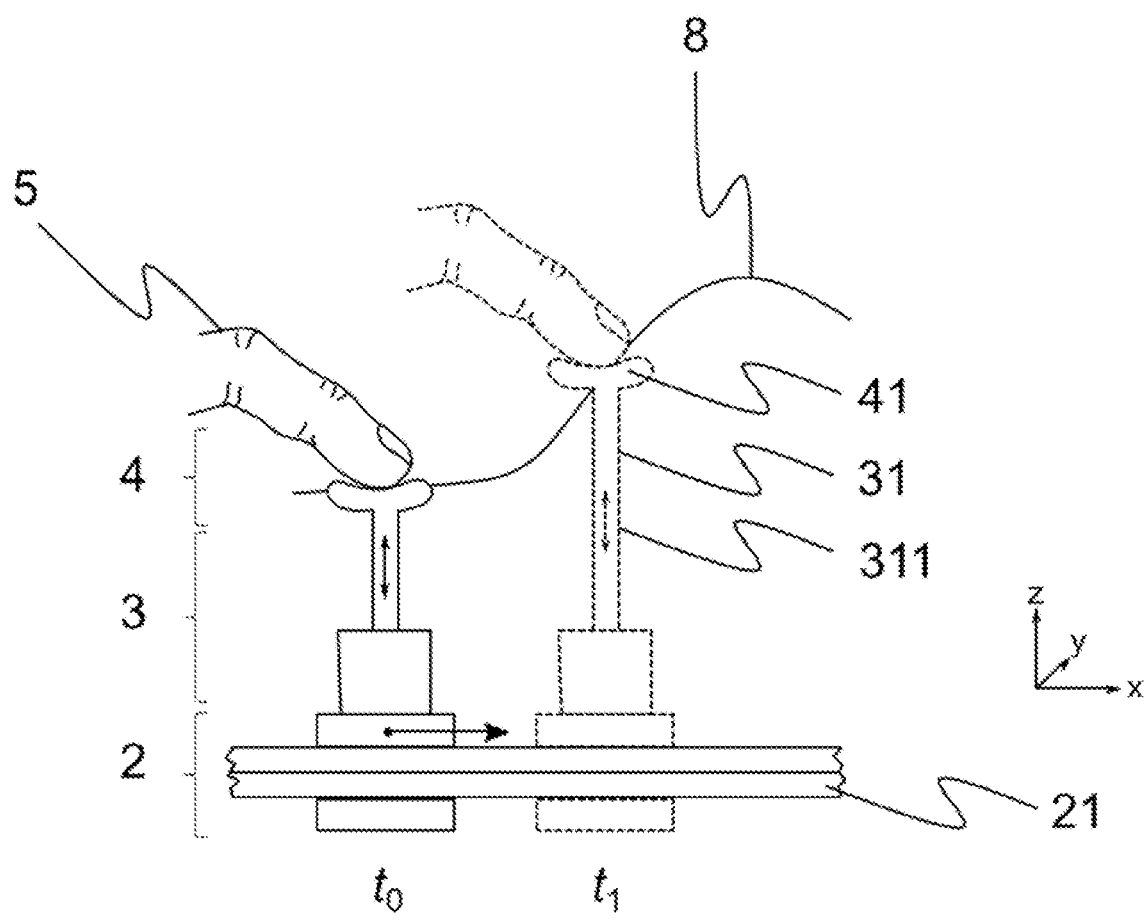

FIG. 2 shows a sketch of how a virtual surface which is variable according to location can be explored haptically by means of the invention. For a better overview, only a portion of a haptic output unit of a haptic system according to the invention is shown. The portion of the output unit is shown at a time to at which the exploration of the virtual surface 8, shown in profile, is started with a finger of a user's hand 5, and at a later time $t_1$ at which the exploration of the virtual surface 8 has advanced. By means of the global positioning system 21, the finger-based positioning element 31 shown, together with the touch surface 41, is shifted between $t_0$ and $t_1$ in the x-direction in order to sample a larger proportion of the virtual surface 8 than is represented by the touch surface 41. Since the virtual surface 8 changes its extension in the z-direction between to and the touch surface 41 is moved upward in the z-direction by means of the linear axis 311 of the finger-based positioning element 31, in order to give the user the impression of unevenness.

FIGS. 3a to 3d each show an exemplary embodiment with respect to the global positioning system of a haptic output unit of a haptic system according to the invention. The global positioning system of FIG. 3a comprises a linearly displaceable unit 211, wherein the movement of the carriage 2111 has two translational degrees of freedom (indicated by the double arrows). The finger-based positioning system (not shown) is arranged on the carriage 2111.

Figure 3A:
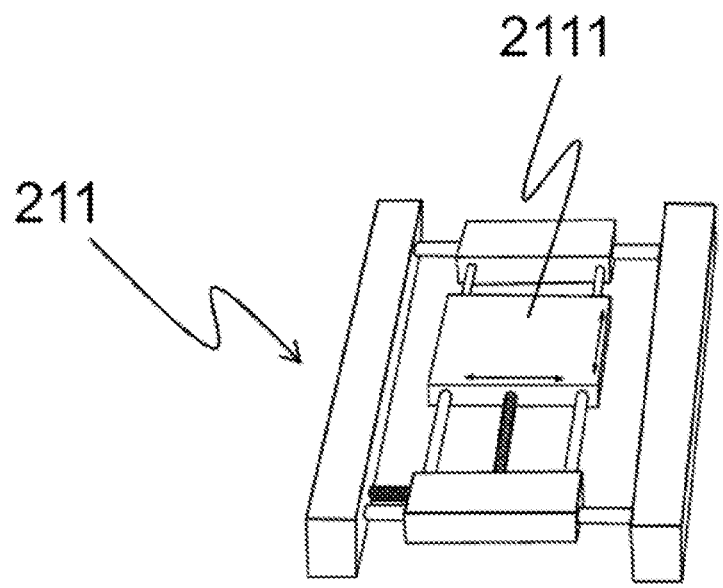
Figure 3B:
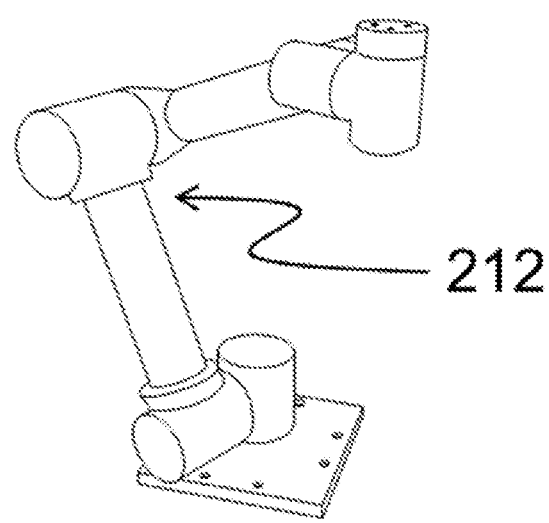

FIG. 3b shows a robot arm 212 as an exemplary embodiment of the global positioning system, with which up to six degrees of freedom of movement can be realised.

Figure 3C:
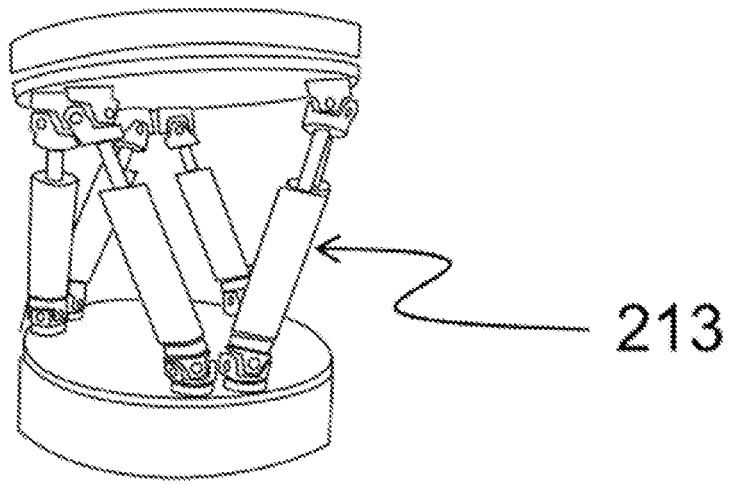

FIG. 3c shows a hexapod 213 as an exemplary embodiment of the global positioning system, having up to six degrees of freedom of movement.

Figure 3D:
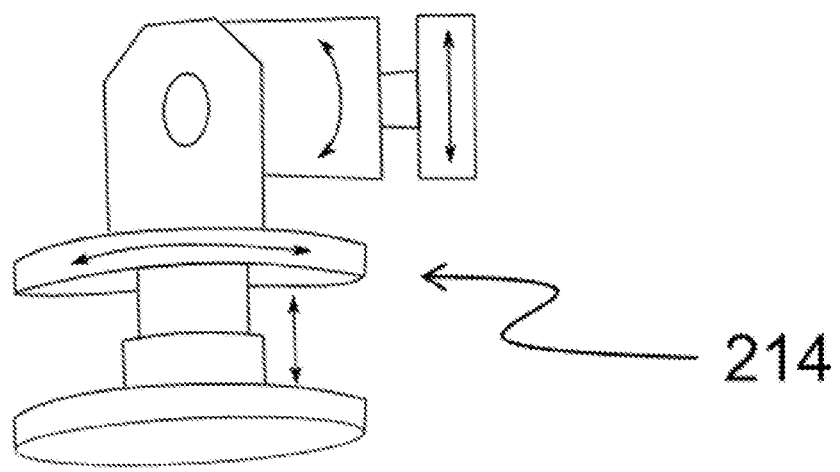

FIG. 3d shows a lifting-rotating arrangement 214 as an exemplary embodiment of the global positioning system, which can also be advantageously combined with the linearly displaceable unit 211 of FIG. 3a to realize further degrees of freedom of movement.

Figure 4A:
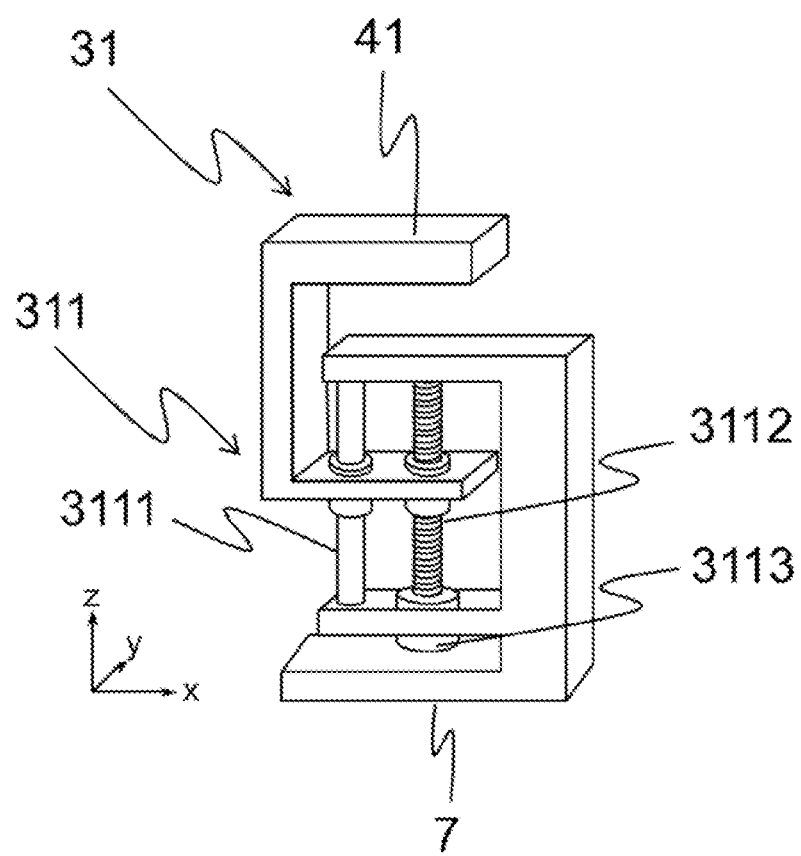
Figure 4B:
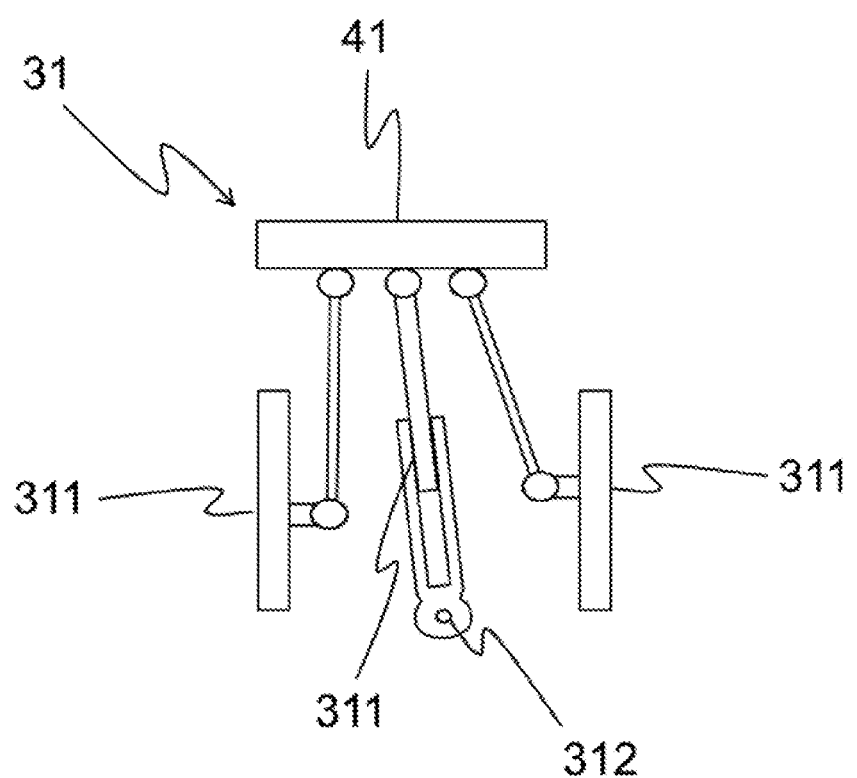

FIGS. 4a and 4b each show an exemplary embodiment of a finger-based positioning element of a haptic output unit of a haptic system according to the invention.

FIG. 4a shows a technically particularly simple finger-based positioning element 31 in the form of a linear axis 311, with which a uniaxial displacement in the z-direction, for the local positioning of a flat touch surface 41, and a force feedback on the same, can be implemented. The linear axis 311 comprises a linear guide 3111 with axle and bushing and a spindle drive 3112 with spindle and spindle nut, as well as a motor having an encoder 3113 with which the exact position in the z-direction is detected. The surface with which the linear axis is attached to a global positioning system (not shown), for example, serves as the base reference surface 7.

FIG. 4b shows a technically more-complex embodiment of a finger-based positioning element 31, in which the position and inclination of the touch surface 41 can be regulated and controlled by means of three linear axes 311. The angle of inclination of the touch surface 41 is determined using an angle sensor 312.

Figure 5:
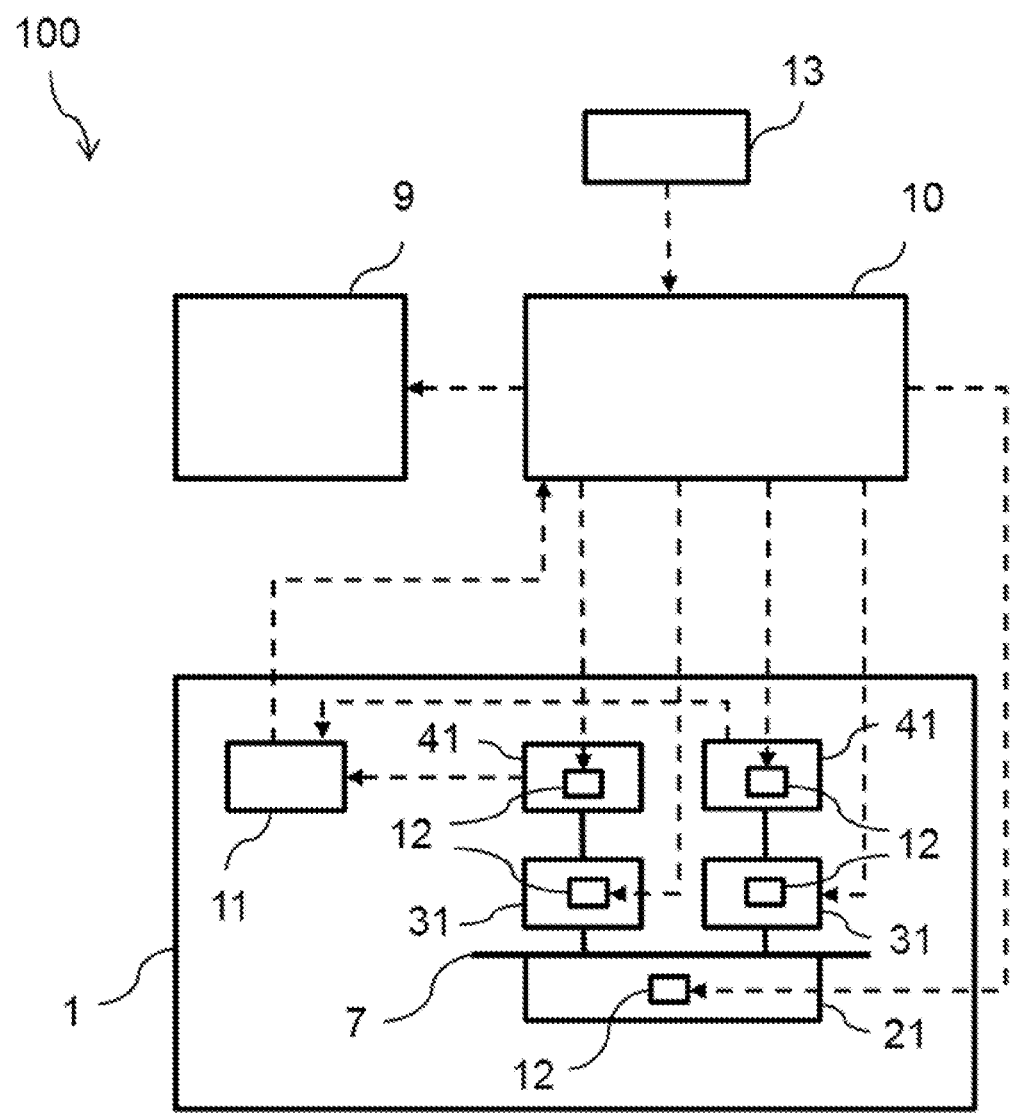

FIG. 5 illustrates the haptic system 100 schematically as a block diagram, in a first embodiment. In addition to the haptic output unit 1, the haptic system 100 comprises a visualisation unit 9 and a data processing unit 10, as well as a position sensor system 13 for contactless detection of the spatial position of the hand of the user. The position sensor system 13 is arranged outside of the output unit 1. The haptic output unit 1 contains the global positioning system 21 and at least two movement-coupled touch surfaces 41 which can be positioned via finger-based positioning elements 31. The touch surfaces 41, the finger-based positioning elements 31, and the global positioning system 21 are physically, firmly connected to each other, which is illustrated by the continuous connecting lines between these elements. However, they can be moved relative to each other. The base reference surface 7 shown in FIG. 1 is also shown here. The haptic output unit 1 also has a sensor system 11 which can contain elements arranged in each of the touch surfaces 41 and/or can have elements respectively assigned to each of the touch surfaces 41 but which are physically spaced apart from the touch surfaces 41. For example, sensor elements based on visual, infrared or ultrasound signals can be arranged physically separate from the touch surfaces 41. The sensor system 11 and the position sensor system 13 deliver data to the data processing unit 10 which are related to a desired direction of movement of the user's hand in relation to the virtual object, or to a position and movement of the user's hand in the real-world space. The data supplied by the sensor system 11 and the position sensor system 13 are processed together with object data already present in the data processing unit 10 or with object data which are supplied to the data processing unit 10 from the outside. As a result, the visualisation unit 9 is controlled by means of control signals from the data processing unit 10 to visualise the virtual object and the user's hand. Data and/or control connections can be wired or non-wired and are illustrated in FIG. 5 by dashed arrows. In addition, elements of the actuator system 12, which is a component of the haptic output unit 1, are controlled by the data processing unit 10 in such a manner that a tactile impression of the surface of the virtual object on which the user's hand is currently located is transmitted to the fingertips of the user's hand by means of the touch surfaces 41 and their position in the real-world space. For this purpose, elements of the actuator system 12 are shown in FIG. 5 in each touch surface 41 and in each finger-based positioning element 31. The global positioning system 21 also contains elements of the actuator system 12 which are used, for example, when a collision point is reached in the first operating mode or when the user's hand moves over a large area. The haptic output unit 1 does not have to be a closed device, the elements of which are all physically connected to each other. Rather, it can consist of several devices which, however, functionally perform the tasks of the haptic output unit 1.

Figure 6A:
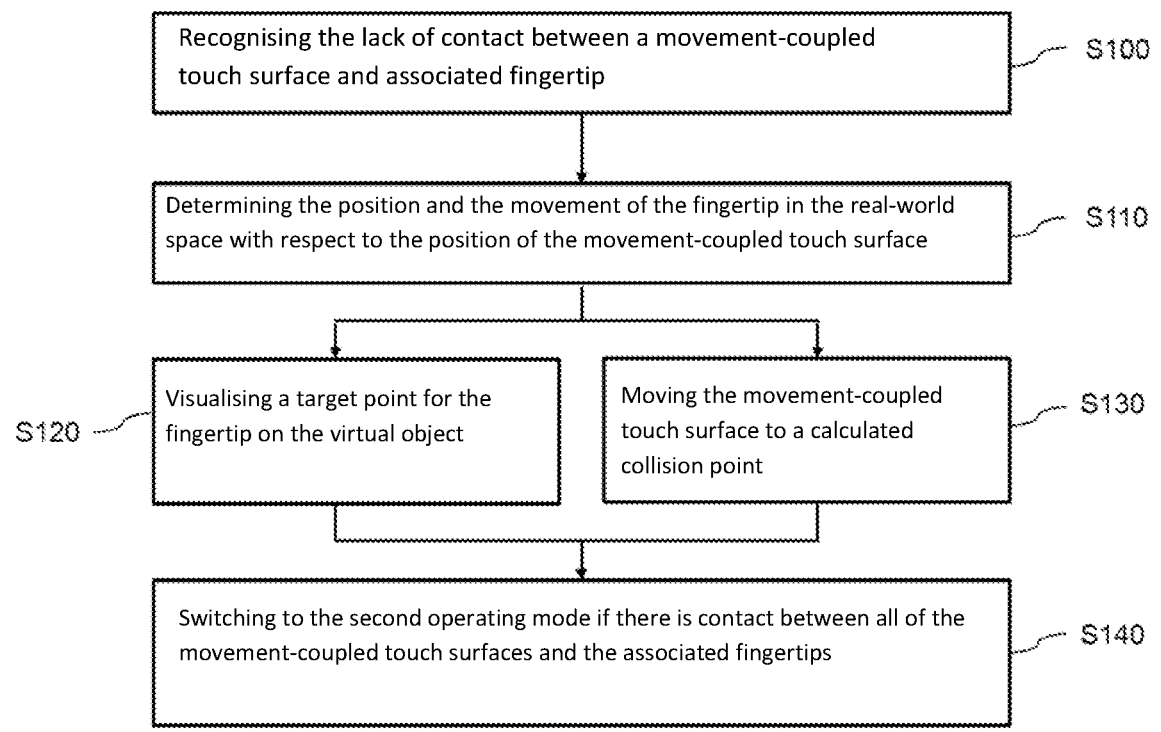
Figure 6B:
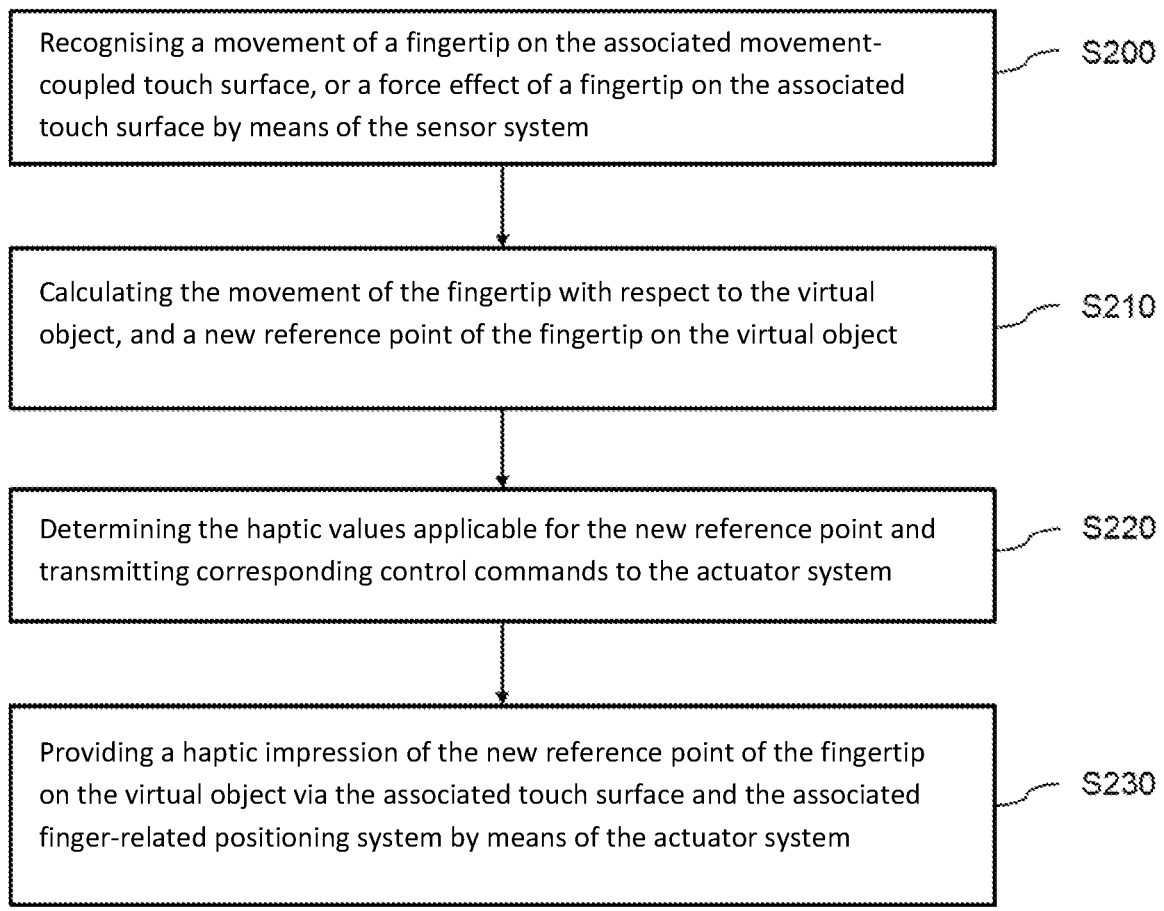

FIGS. 6a and 6b show some steps of the method according to the invention for the haptic interaction with a virtual object, wherein the two basic operating modes (no contact of at least one fingertip with the assigned touch surface, or contact of all fingertips with the respectively assigned touch surfaces) are considered.

FIG. 6a shows steps of the first operating mode, in which there is no contact of at least one fingertip with the assigned touch surface, but the user is already "in the virtual space". In this state, it should be possible for the user to place all fingertips exactly on the associated touch surfaces without removing the visualisation unit, for example VR glasses (virtual reality), and thus without having eye contact with the touch surfaces of the output unit. The lack of contact between the fingertip and the touch surface is recognised in a first step S100, for example by the sensor system. In the next step, the position and the movement of the fingertip in real-world space is determined in relation to the position of the assigned, movement-coupled touch surface (S110). The sensor system of the output unit, or another sensor system, for example the position sensor system, can also be used for this purpose. In general, the position and movement of the entire user's hand are determined, from which the position and movement of the corresponding fingertip can be extrapolated. In a subsequent step, either a target point for the fingertip on the virtual object is visualised for the user by the visualisation unit (S120), or the movement-coupled touch surface is moved to a collision point calculated from the known position and movement of the user's hand and the known position of the touch surface in real-world space (S130). Both steps can also be carried out simultaneously or in succession. As soon as there is contact between all fingertips and the associated touch surface, i.e., detected by the sensor system, the system switches to the second operating mode (S140).

FIG. 6b shows steps of the second operating mode, in which there is contact between all fingertips and the respectively assigned touch surfaces. This is the actual operating mode of the haptic system, in which the user receives haptic impressions of the virtual object, which is visualised by the visualisation unit, and can move his fingers or hand freely over the virtual object. A desired movement of the hand over the virtual object is "carried out" from a first reference point of the fingertip by moving the fingertip on the associated touch surface or by shifting the touch surface within the interaction region as the result of a force exerted by the user's hand on the touch surface. If such a movement of the fingertip on the associated touch surface or a force of the user's hand on the touch surface is recognised by means of the sensor system (step S200), the data processing unit calculates the movement of the fingertip in relation to the virtual object and determines a new reference point of the fingertip on the virtual object (S210). For this new reference point, applicable haptic values are then determined—for example, retrieved from a database—by the data processing unit, and corresponding control commands are transmitted to the actuator system of the output unit (S220). The actuator system present in the associated touch surface and the finger-based positioning system then provides a haptic impression, as well as a tactile impression, to the fingertip corresponding to the new reference point on the virtual object, by corresponding settings of the position of the touch surface, of contour, texture, type of vibration, vibration intensity, temperature and/or elasticity of the touch surface (S230).

Figure 7:
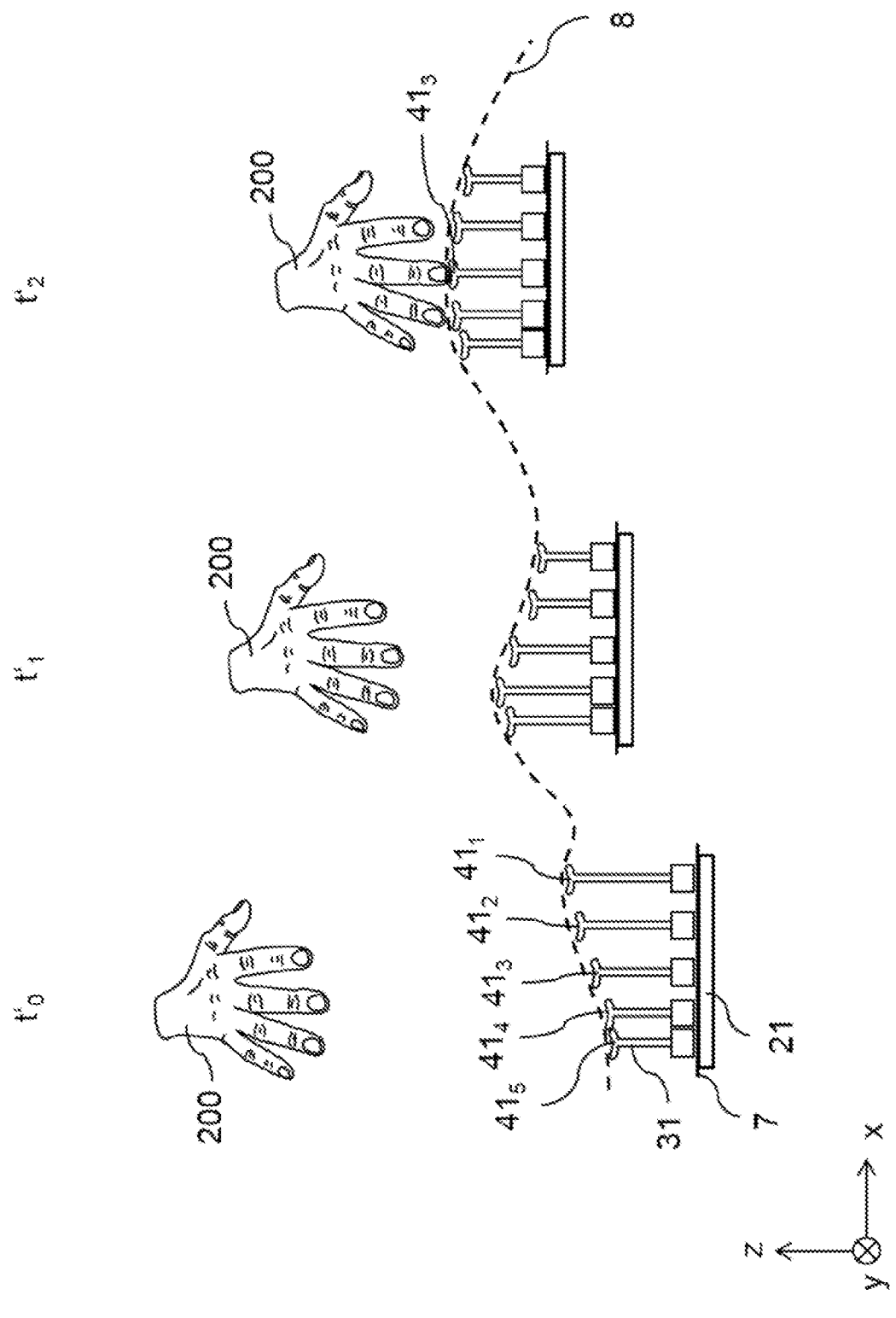
FIG. 7 shows the course over time of a method for establishing contact points in the first operating mode.

With reference to FIG. 7, an embodiment of the method for establishing contact between the user's hand and the haptic output unit in the first operating mode, in which the touch surfaces are moved to a calculated collision point, is explained in more detail. For reasons of great clarity, only part of a haptic output unit of a haptic system according to the invention is shown. FIG. 7 shows a sketch of the global positioning system 21, the reference surface 7, five finger-based positioning elements 31 of the haptic output unit with the respectively associated touch surfaces $41_1$ to $41_5$ and a user's hand 200 at different points in time in the first operating mode.

At time $t'_0$, the user's hand 200 is still very far away from the haptic output unit; at the same time, the finger-based positioning elements 31 with their associated touch surfaces $41_1$ to $41_5$ are positioned corresponding to the virtual surface 8 of the virtual object—i.e., the surface shape of the virtual object at the location where the user's hand is projected virtually. A "virtual projection of the user's hand" means the virtual depiction of the user's hand by means of parallel reference lines onto the virtual surface 8. To do this, it is necessary to detect the position of the user's hand 200 in real-world space and to transfer it to the virtual space. The virtual surface 8 is represented by the dashed line. At time $t'_0$, the user's hand 200 (based on a reference point, for example the centre of the palm of the hand) is at a first point in the space which is identified by the coordinates ($x_{2000}$, $y_{2000}$, $z_{2000}$) in the x-y-z coordinate system. The touch surfaces $41_1$ to $41_5$ are each located in the same space at a first point which is identified by the coordinates ($x_{i0}$, $y_{i0}$, $z_{i0}$), where i=1 to 5. The touch surface $41_1$ is assigned to the thumb of the user's hand 200, the touch surface $41_2$ is assigned to the index finger of the user's hand 200, etc. The position of the touch surfaces $41_1$ to $41_5$ in the space is determined not only by the position of the global positioning system 21 of the haptic output unit, but also is determined via the position of the finger-based positioning elements 31.

If the user's hand 200 moves further in the space over time, at time $t'_1$, it will be at a second point in space which is identified by the coordinates ($x_{2001}$, $y_{2001}$, $z_{2001}$). The touch surfaces $41_1$ to $41_5$ are now each located at a second point which is identified by the coordinates ($x_{i1}$, $y_{i1}$, $z_{i1}$), where i=1 to 5, and form the virtual surface 8 at the projection location of the user's hand 200 at time $t'_1$. At a later time $t'_2$, the user's hand 200 is located at a third point in the space, which is identified by the coordinates ($x_{2002}$, $y_{2002}$, $z_{2002}$). The touch surfaces $41_1$ to $41_5$ are now each located at a third point which is identified by the coordinates ($x_{i2}$, $y_{i2}$, $z_{i2}$), where i=1 to 5, and form the virtual surface 8 at the projection location of the user's hand 200 at time $t'_2$. Since the user's hand has also moved in the x- and y-directions in the example shown, the virtual surface 8 can have a different shape at any time, according to the contour of the virtual object, and can be at a different height along the z-axis. This is shown by way of example in FIG. 7. Large differences in height of the virtual surface are realised by shifting the global positioning system 21 in the space.

For each point in time of the method, a point of collision of the user's hand with the surface of the virtual object is calculated from the position and movement of the user's hand 200 and the position of the touch surfaces $41_1$ to $41_5$, and the touch surfaces $41_1$ to $41_5$ are moved to it. As a result, the user's hand 200 and the haptic output unit ultimately meet, and contact is made on the virtual surface 8.

As can be seen, the distance between the user's hand 200 and the touch surfaces $41_1$ to $41_5$ decreases over time, and contact with the associated touch surface $41_3$ is established at least for the fingertip of the middle finger at time $t'_2$. Subsequently, the contact of the other fingertips of the user's hand with the respectively associated touch surfaces is established automatically, wherein adjustments of the relative distances of the touch surfaces $41_1$ to $41_5$ with respect to each other must optionally be made according to the size of the user's hand 200.

Figure 8:
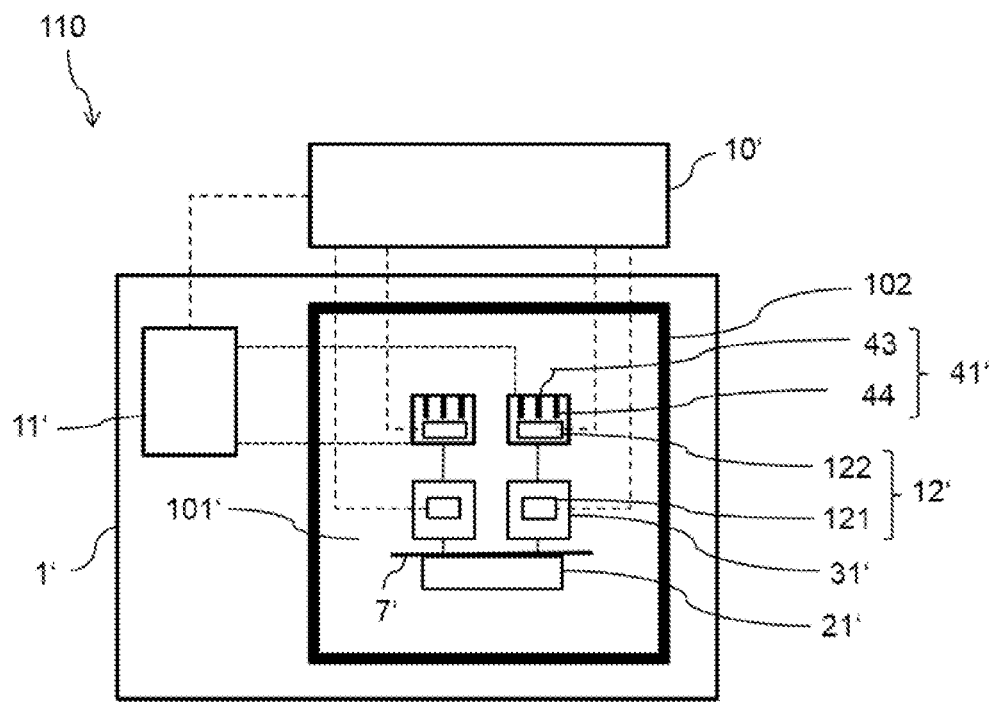
FIG. 8 shows a schematic illustration of the elements of the system according to the invention for conveying information for the blind and visually impaired, in one embodiment.
Figure 9:
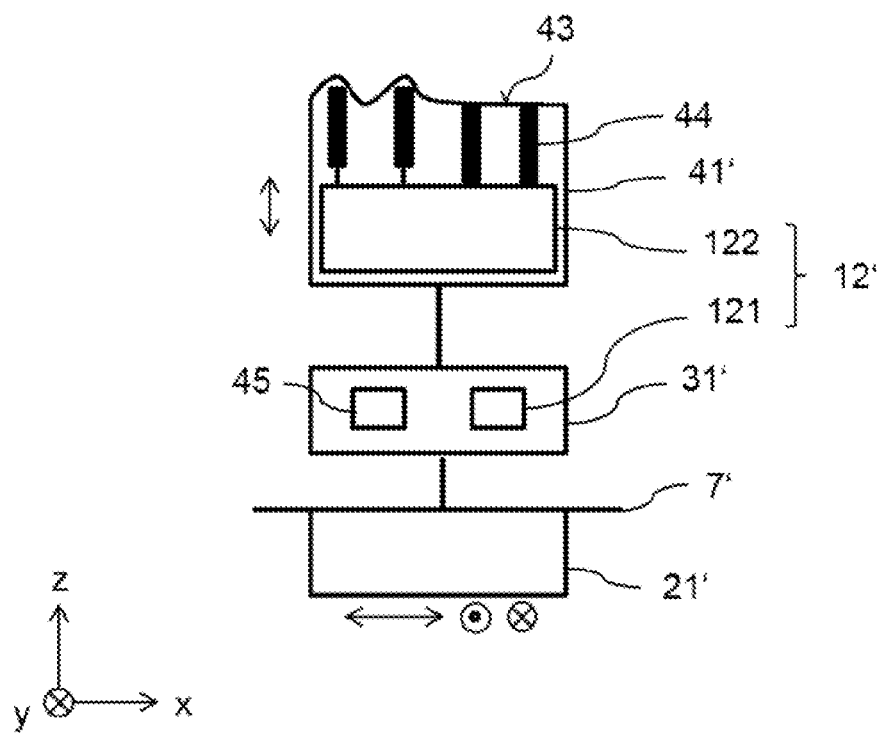
FIG. 9 shows a schematic illustration of some elements of the haptic output unit of the system according to the invention for conveying information for the blind and visually impaired from FIG. 8.

FIG. 8 schematically shows the elements of the system according to the invention for conveying information for the blind and visually impaired, in an embodiment 110, while FIG. 9 shows some elements of the haptic output unit 1' of this embodiment 110 in detail.

The system 110 for conveying information for the blind and visually impaired comprises a haptic output unit 1' and a data processing unit 10'. The haptic output unit 1' has an interaction region 101' which is delimited by a frame 102 in a first direction (x-direction in FIG. 9) and a second direction (y-direction in FIG. 9), wherein the first direction and the second direction are perpendicular to each other. The haptic output unit 1' also has two touch surfaces 41' which constitute movement-coupled segments of the interaction region 101' since they can be moved within the interaction region 101' by a user, at least along the first direction or the second direction. Each of the touch surfaces 41' is assigned to exactly one fingertip of a hand of the user. Here, fingertips of different hands of the user can also be assigned to different touch surfaces 41'. Each touch surface 41' is connected to a finger-based positioning element 31' assigned to this touch surface 41'. If a plurality of touch surfaces 41' is assigned to fingertips of one and the same hand of the user, the movement of the individual touch surfaces 41' relative to each other in the first and/or the second direction can be prohibited. In other words: In this case, the corresponding individual touch surfaces 41' can only be moved together—i.e., at a fixed relative distance from each other—in the first and/or second direction. This is the case in the illustrated example, since the two touch surfaces 41' can be moved in the first and/or second direction by means of a single, shared global positioning system 21'. However, the movement of one of the touch surfaces 41' in the first and/or the second direction can also be implemented by the finger-based positioning system 31' assigned to this touch surface 41'. In addition, the movement of the touch surfaces 41' in the first and/or second direction can also be limited, restricted or unrestricted in time, by appropriate devices, such as retainers or blocks. In this way, for example, grid-bound movements of the touch surfaces 41' can initially only be specified along the first direction, and then along the second direction only after the frame 102 is reached. Preferably, however, the touch surfaces 41' can be moved entirely freely in the first and the second direction within the interaction region 101'.

In addition, the user's fingertip on the touch surface 41' can be changed. This means that the fingertip is not fastened to the touch surface 41' with mechanical aids such as straps, clamps, caps or the like, but can be rolled in the first and/or second direction, for example over the touch surface 41'. The user thus has a natural feeling when using the haptic output unit 1' and can better experience the details of a relief created on a finger contact surface 43 of the touch surface 41'.

In any case, the finger-based positioning system 31' realizes the movement of the assigned touch surface 41' in a third direction (the z-direction in FIG. 9), wherein the third direction is perpendicular to the first direction and the second direction. The movement of the touch surface 41' along the third direction is controlled by a height actuator 121, which is part of an actuator system 12' of the haptic output unit 1'. In order to provide the user with information about the change in the position of the touch surface 41' along the third direction—that is to say, the height of the touch surface 41'—contact forces are exerted on the fingertips of the user's hand by the actuator system 12', via the touch surfaces 41'. For this purpose, a base reference surface 7' is assigned to the haptic output unit 1', enabling a force feedback.

In addition to the height actuator 121, the actuator system 12' also has a relief actuator 122 which can produce a relief or other haptic impressions, such as vibrations, on the finger contact surface 43. The touch surfaces 41' of the system 110 for conveying information for the blind and visually impaired each have a plurality of lifting elements 44 which can implement such a relief on the finger contact surface 43. The lifting elements 44 can lift individual areas of the finger contact surface 43 beyond a zero position, as shown in FIG. 9, or can also penetrate the finger contact surface 43, for example as pins. If the lifting elements 44 are arranged in a manner corresponding to a Braille cell, then letters, numbers or symbols can also be represented in Braille.

The haptic output unit 1' also has a sensor system 11' for detecting the position of the touch surfaces 41' within the interaction region 101'. On the basis of the position of the touch surfaces 41' transmitted from the sensor system 11' to the data processing unit 10' and the information to be conveyed by means of the haptic output unit 1', the data processing unit 10' controls the actuator system 12' of the haptic output unit 1' in such a way that each touch surface 41' is positioned, according to the information to be conveyed, along the third direction by the finger-based positioning element 31' and, in the exemplary embodiment shown, a defined relief is simultaneously produced on the finger contact surface 43. As such, for example, the information content of a computer screen page or information about a virtual body can be conveyed to the blind and visually impaired.

The dashed lines shown in FIG. 8 between the individual elements of the system 110 are data or signal lines which are used for the wired or wireless exchange of data or signals, or for the hydraulic, pneumatic or mechanical control of elements. Solid connecting lines, on the other hand, represent mechanically fixed and load-bearing connections.

In addition to the elements already described, FIG. 9 also shows a detector 45 in the finger-based positioning system 31'. This detector 45 is used to detect an input by the user—for example, by an active movement of the touch surface 41' along the third direction (the z-direction) in the direction of the base reference surface 7'. The user can thus select and confirm an icon or a command on a computer screen page displayed by means of the haptic output unit 1', for example.

Advantageously, to display a variety of information and/or to display very large-area information, it is not necessary to display all information, or not all of the information parts, simultaneously on a large interaction region; rather, only the information or information parts which correspond to the current position of the touch surfaces is/are displayed. This drastically reduces the resources required for data processing and control of the actuator system, as well as the number of actuators required within the interaction region. This means that information can be displayed more quickly and more precisely. In addition, the inclusion of the third direction in the representation of the information enables an improvement in the conveyance of information even in the case of planar, i.e., two-dimensional, information (such as letters) and the conveyance of information about three-dimensional, but only-virtual bodies.

Of course, the number of touch surfaces 41 and lifting elements 44 is not limited to the number shown in FIGS. 8 and 9 but can be selected as desired according to the application. Other combinations of elements or their properties are also possible as long as they are not mutually exclusive.

In some non-limiting embodiments, the invention is as described in the following clauses:

Clauses

1. A system (100) for haptic interaction with virtual objects, comprising
   a visualisation unit (9) for visualising virtual objects and the user's hand (5),
   a haptic output unit (1) for reproducing haptic impressions at least by means of force feedback on fingertips of the user's hand (5),
   a data processing unit (10) for processing input data and controlling the visualisation unit (9) and the haptic output unit (1),
   wherein a virtual object is characterised by haptic properties which vary according to location and are simulated by means of an interaction region (101),
   characterised in that the haptic output unit (1) comprises:
   at least two movement-coupled segments (41) of the interaction region (101), wherein the movement-coupled segments (41) of the interaction region (101) are designed as touch surfaces, and each movement-coupled segment (41) of the interaction region (101) is assigned to one fingertip of the user's hand (5) and can be moved by the latter, wherein the position of the fingertip on the movement-coupled segment (41) can be changed,
   a finger-based positioning system comprising at least two finger-based positioning elements (31), each assigned to one movement-coupled segment (41) of the interaction region (101), wherein the finger-based positioning elements (31) and the movement-coupled segment (41) of the interaction region (101) assigned to it are operatively connected,
   a global positioning system (21) by means of which the finger-based positioning system can be moved, or which is designed as a displacement of the virtual world in which the virtual object is arranged,
   wherein the haptic output unit (1) further comprises:
   a sensor system (11) at least for detecting the position of the movement-coupled segments (41) of the interaction region (101) with respect to the virtual object, and the contact forces between the movement-coupled segments (41) of the interaction region (101) and the fingertips of the user's hand (5),
   an actuator system (12) at least for positioning the movement-coupled segments (41) of the interaction region (101) with respect to the virtual object and for exerting contact forces on the fingertips of the user's hand (5) by means of the movement-coupled segments (41) of the interaction region (101),
   and
   wherein a base reference surface (7) for the force feedback is assigned to the haptic output unit (1).
2. The system according to clause 1, characterised in that the system (100) further comprises a position sensor system (13) for contactless detection of the spatial position of the user's hand (5).
3. The system according to clause 1 or 2, characterised in that the haptic output unit (1) has five movement-coupled segments (41) of the interaction region (101), such that one movement-coupled segment (41) of the interaction region (101) can be arranged on each fingertip of the user's hand (5).
4. The system according to any one of the preceding clauses, characterised in that the haptic output unit (1) is designed to simulate haptic impressions by means of tactile feedback on fingertips of the user's hand (5).

5. The system according to clause 4, characterised in that the movement-coupled segments (41) of the interaction region (101) are designed to be changeable with respect to their contour or texture or type of vibration or vibration intensity or temperature or elasticity or a combination of the aforementioned properties.

6. The system according to any one of the preceding clauses, characterised in that the haptic output unit (1) has adjusting elements (6) for adaptation to the size of the user's hand (5).

7. The system according to any one of the preceding clauses, characterised in that the finger-based positioning system and/or the global positioning system (21) has/have six or more degrees of freedom of movement.

8. The system according to any one of the preceding clauses, characterised in that the movement-coupled segments (41) of the interaction region (101) can be displaced by means of the finger-based positioning system in such a manner that at least their centre point or their surface normal coincides with the centre point or the surface normal of the virtual surface (8), and preferably their centre point and their surface normal coincide with the centre point and the surface normal of the virtual surface (8).

9. The system according to any one of the preceding clauses, characterised in that the sensor system (11) comprises, at least for detecting the position of the movement-coupled segments (41) of the interaction region (101) with respect to the virtual object, microswitches with discrete switching points or encoders or resistive measuring elements or optical measuring elements or capacitive measuring elements or inductive measuring elements or a combination of the aforementioned.

10. The system according to any one of the preceding clauses, characterised in that the global positioning system (21) comprises means (211, 212, 213, 214) for linear displacement and/or rotation of the finger-based positioning system.

11. The system according to clause 10, characterised in that the means comprise a linearly displaceable unit (211) or a robotic arm (212) or a hexapod (213) or a lifting/rotating arrangement (214) or a combination of the aforementioned.

12. The system according to any one of the preceding clauses, characterised in that the finger-based positioning system comprises at least one motorised linear axis (311) for each finger-based positioning element (31), by means of which a movement-coupled segment (41) of the interaction region (101) can be displaced in an axial direction and/or an angle of inclination of the finger-based positioning element (31) and/or of the movement-coupled segment (41) of the interaction region (101) can be adjusted with respect to the base reference surface (7).

13. The system according to clause 12, characterised in that the linear axis (311) comprises a toothed belt drive or a spindle drive or a linear motor or an ultrasonic piezo motor or an element with a shape memory alloy, or a combination of the aforementioned.

14. The system according to clause 12 or 13, characterised in that the haptic output unit (1) comprises a sensor system (11) for detecting the angle of inclination of the finger-based positioning element (31) and/or the movement-coupled segment (41) of the interaction region (101) relative to the base reference surface (7), which preferably comprises angle sensors (312) or force sensors or spring elements or linear distance sensors, or a combination of the aforementioned.

15. A method for haptic interaction with virtual objects using the system according to any one of the clauses 2 to 13, comprising the steps of:
    in a first operating mode, when there is no contact between one of the fingertips and one of the movement-coupled segments (41), determining the position and the movement of the user's hand (5) in space in relation to the position of the movement-coupled segments (41) without contact by means of the position sensor system (13), and subsequent visualisation on the virtual object of a target point for each movement-coupled segment (41) for which there is no contact between the corresponding fingertip and the movement-coupled segment (41), wherein the target point corresponds to the real position of the movement-coupled segment (41), and/or moving the movement-coupled segments (41) for which there is no contact between the corresponding fingertip and the movement-coupled segment (41) to a collision point calculated from the position and the movement of the user's hand (5) and the position of the movement-coupled segments (41), and
    in a second operating mode, if there is contact between each of the movement-coupled segments (41) and the fingertips assigned to them, calculating the movement of the user's hand (5) with respect to the virtual object from the movement of the fingertips on the movement-coupled segments (41) and/or from a force effect of the fingertips on the movement-coupled segments (41).

16. A system (110) for conveying information for the blind and visually impaired, comprising
    a haptic output unit (1') for reproducing haptic impressions on fingertips of the user's hand (5),
    a data processing unit (10') for processing input data and for controlling the haptic output unit (1'),
    wherein information is characterised by properties which can vary according to location and which are simulated haptically by means of the haptic output unit (1') in an interaction region (101'),
    wherein the haptic output unit (1') comprises:
    a frame (102) which delimits the interaction region (101'), wherein the interaction region (101') extends in a first direction and a second direction which is perpendicular to the first direction,
    at least one movement-coupled segment (41') of the interaction region (101'), wherein each movement-coupled segment (41') of the interaction region (101') is designed as a touch surface and assigned to exactly one fingertip of the user's hand (5), and can be moved by the same in the interaction region (101') along the first and/or the second direction, wherein the position of the fingertip on the movement-coupled segment (41') can be changed,
    a finger-based positioning system comprising at least one finger-based positioning element (31'), wherein each finger-based positioning element (31') is assigned to exactly one movement-coupled segment (41') of the interaction region (101'), and the finger-based positioning element (31') and the movement-coupled segment (41') of the interaction region (101') assigned to it are operatively connected,
    a sensor system (11') at least for detecting the position of the movement-coupled segments (41') of the interaction region (101') within the interaction region (101'), an actuator system (12') which is suitable for creating the haptic impression of the movement-coupled segments (41') of the interaction region (101') in accordance with the properties of the information, characterised in that each finger-based positioning element (31') is suitable for moving the respective movement-coupled segment (41') along a third direction, wherein the third direction is perpendicular to the first and the second directions, and the actuator system (12') is suitable for positioning the movement-coupled segments (41') of the interaction region (101') according to the properties of the information, and for exerting contact forces on the fingertips of the user's hand (5) by means of the movement-coupled segments (41') of the interaction region (101'), wherein a base reference surface (7') for the force feedback is assigned to the haptic output unit (1').

17. The system (110) for conveying information for the blind and visually impaired according to clause 16, characterised in that each segment (41') of the interaction region (101') has a plurality of pin-shaped lifting elements (44), and the actuator system (12') is suitable for controlling the lifting elements (44) of the respective movement-coupled segment (41') in such a manner that they produce a tactile relief on the surface of the movement-coupled segment (41').

18. The system (110) for conveying information for the blind and visually impaired according to clause 16 or 17, characterised in that each movement-coupled segment (41') and/or each finger-based positioning element (31') further contains a detector (45) which is suitable for detecting user input.

REFERENCE NUMERALS

1, 1' Haptic output unit
2 Lower layer
21, 21' Global positioning system
211 Linearly displaceable unit
2111 Carriage
212 Robot arm
213 Hexapod
214 Lifting-rotating arrangement
3 Middle layer
31, 31' Finger-based positioning element
311 Linear axis
3111 Linear guide
3112 Spindle drive
3113 Motor with encoder
312 Angle sensor
4 Upper layer
41, 41$_1$-41$_5$, 41' Touch surface (system according to the invention)
42 Touch surface (according to the prior art)
43 Finger contact surface
44 Lifting element
45 Detector
5 User's hand
6 Adjusting element
7, 7' Base reference surface
8 Virtual surface
9 Visualisation unit
10, 10' Data processing unit
11, 11' Sensor system
12, 12' Actuator system
13 Position sensor system
100 System for haptic interaction
101, 101' Interaction region (system according to the invention)
102 Frame
110 System for conveying information for the blind and visually impaired
121 Height actuator
122 Relief actuator
201 Interaction region (according to the prior art)
$t_0$, $t_1$ Points in time of virtual surface exploration
$t'_0$, $t'_1$, $t'_2$ Points in time in the method for establishing contact

The invention claimed is:

1. A system for haptic interaction with virtual objects, comprising
   a visualisation unit for visualising virtual objects and the user's hand,
   a haptic output unit for reproducing haptic impressions at least by means of force feedback on fingertips of the user's hand,
   a data processing unit for processing input data and controlling the visualisation unit and the haptic output unit,
   wherein a virtual object has haptic properties which vary according to location and are simulated by means of an interaction region,
   wherein the haptic output unit comprises:
   at least two movement-coupled segments of the interaction region, wherein the movement-coupled segments of the interaction region are designed as touch surfaces, and each movement-coupled segment of the interaction region is assigned to one fingertip of the user's hand and can be moved by the latter, wherein the position of the fingertip on the movement-coupled segment can be changed,
   a finger-based positioning system comprising at least two finger-based positioning elements, each assigned to one movement-coupled segment of the interaction region, wherein the finger-based positioning elements and the movement-coupled segment of the interaction region assigned to it are operatively connected,
   a global positioning system by means of which the finger-based positioning system can be moved, or which is designed as a displacement of the virtual world in which the virtual object is arranged,
   wherein the haptic output unit further comprises:
   a sensor system at least for detecting the position of the movement-coupled segments of the interaction region with respect to the virtual object, and the contact forces between the movement-coupled segments of the interaction region and the fingertips of the user's hand,
   an actuator system at least for positioning the movement-coupled segments of the interaction region with respect to the virtual object and for exerting contact forces on the fingertips of the user's hand by means of the movement-coupled segments of the interaction region, and
   wherein a base reference surface for the force feedback is assigned to the haptic output unit.

2. The system according to claim 1, wherein the system further comprises a position sensor system for contactless detection of the spatial position of the user's hand.

3. A method for haptic interaction with virtual objects using the system according to claim 2, comprising the steps of:

in a first operating mode, when there is no contact between one of the fingertips and one of the movement-coupled segments, determining the position and the movement of the user's hand in space in relation to the position of the movement-coupled segments without contact by means of the position sensor system, and subsequent visualisation on the virtual object of a target point for each movement-coupled segment for which there is no contact between the corresponding fingertip and the movement-coupled segment, wherein the target point corresponds to the real position of the movement-coupled segment, and/or moving the movement-coupled segments for which there is no contact between the corresponding fingertip and the movement-coupled segment to a collision point calculated from the position and the movement of the user's hand and the position of the movement-coupled segments, and in a second operating mode, if there is contact between each of the movement-coupled segments and the fingertips assigned to them, calculating the movement of the user's hand with respect to the virtual object from the movement of the fingertips on the movement-coupled segments and/or from a force effect of the fingertips on the movement-coupled segments.

4. The system according to claim 1, wherein the haptic output unit has five movement-coupled segments of the interaction region, such that one movement-coupled segment of the interaction region can be arranged on each fingertip of the user's hand.

5. The system according to claim 1, wherein the haptic output unit is designed to simulate haptic impressions by means of tactile feedback on fingertips of the user's hand.

6. The system according to claim 5, wherein the movement-coupled segments of the interaction region are designed to be changeable with respect to their contour or texture or type of vibration or vibration intensity or temperature or elasticity or a combination of the aforementioned properties.

7. The system according to claim 1, wherein the haptic output unit has adjusting elements for adaptation to the size of the user's hand.

8. The system according to claim 1, wherein the finger-based positioning system and/or the global positioning system has/have six or more degrees of freedom of movement.

9. The system according to claim 1, wherein the movement-coupled segments of the interaction region can be displaced by means of the finger-based positioning system in such a manner that at least their centre point or their surface normal coincides with the centre point or the surface normal of the virtual surface, and preferably their centre point and their surface normal coincide with the centre point and the surface normal of the virtual surface.

10. The system according to claim 1, wherein the sensor system comprises, at least for detecting the position of the movement-coupled segments of the interaction region with respect to the virtual object, microswitches with discrete switching points or encoders or resistive measuring elements or optical measuring elements or capacitive measuring elements or inductive measuring elements or a combination of the aforementioned.

11. The system according to claim 1, wherein the global positioning system comprises means for linear displacement and/or rotation of the finger-based positioning system.

12. The system according to claim 11, wherein the means comprise a linearly displaceable unit or a robotic arm or a hexapod or a lifting/rotating arrangement or a combination of the aforementioned.

13. The system according to claim 1, wherein the finger-based positioning system comprises at least one motorised linear axis for each finger-based positioning element, by means of which a movement-coupled segment of the interaction region can be displaced in an axial direction.

14. The system according to claim 13, wherein the linear axis comprises a toothed belt drive or a spindle drive or a linear motor or an ultrasonic piezo motor or an element with a shape memory alloy, or a combination of the aforementioned.

15. The system according to claim 1, wherein the finger-based positioning system comprises at least one motorised linear axis for each finger-based positioning element, by means of which an angle of inclination of the finger-based positioning element and/or of the movement-coupled segment of the interaction region can be adjusted with respect to the base reference surface.

16. The system according to claim 15, wherein the haptic output unit comprises a sensor system for detecting the angle of inclination of the finger-based positioning element and/or the movement-coupled segment of the interaction region relative to the base reference surface, which preferably comprises angle sensors or force sensors or spring elements or linear distance sensors, or a combination of the aforementioned.

17. The system according to claim 1, wherein each of the movement-coupled segments of the interaction region is movable independently of the other movement-coupled segment of the interaction region in the x- and y-directions within the limits of the mobility of the user's hand.

18. A system for conveying information for the blind and visually impaired, comprising
a haptic output unit for reproducing haptic impressions on fingertips of the user's hand,
a data processing unit for processing input data and for controlling the haptic output unit,
wherein information is categorized by properties which can vary according to location and which are simulated haptically by means of the haptic output unit in an interaction region,
wherein the haptic output unit comprises:
a frame which delimits the interaction region, wherein the interaction region extends in a first direction and a second direction which is perpendicular to the first direction,
at least one movement-coupled segment of the interaction region, wherein each movement-coupled segment of the interaction region is designed as a touch surface and assigned to exactly one fingertip of the user's hand, and can be moved by the same in the interaction region along the first and/or the second direction, wherein the position of the fingertip on the movement-coupled segment can be changed,
a finger-based positioning system comprising at least one finger-based positioning element, wherein each finger-based positioning element is assigned to exactly one movement-coupled segment of the interaction region, and the finger-based positioning element and the movement-coupled segment of the interaction region assigned to it are operatively connected,
a sensor system at least for detecting the position of the movement-coupled segments of the interaction region within the interaction region,
an actuator system which is suitable for creating the haptic impression of the movement-coupled segments of the interaction region in accordance with the properties of the information, wherein
- each finger-based positioning element is suitable for moving the respective movement-coupled segment along a third direction, wherein the third direction is perpendicular to the first and the second directions, and
- the actuator system is suitable for positioning the movement-coupled segments of the interaction region according to the properties of the information, and for exerting contact forces on the fingertips of the user's hand by means of the movement-coupled segments of the interaction region, wherein a base reference surface for the force feedback is assigned to the haptic output unit.

19. The system for conveying information for the blind and visually impaired according to claim 18, wherein
- each segment of the interaction region has a plurality of pin-shaped lifting elements, and
- the actuator system is suitable for controlling the lifting elements of the respective movement-coupled segment in such a manner that they produce a tactile relief on the surface of the movement-coupled segment.

20. The system for conveying information for the blind and visually impaired according to claim 18, wherein each movement-coupled segment and/or each finger-based positioning element further contains a detector which is suitable for detecting user input.

* * * * *